United States Patent
Lee et al.

(10) Patent No.: US 10,599,274 B2
(45) Date of Patent: Mar. 24, 2020

(54) TOUCH DISPLAY DEVICE AND TOUCH PANEL

(71) Applicant: LG Display Co., Ltd., Seoul (KR)

(72) Inventors: JaeGyun Lee, Gyeonggi-do (KR); KwangJo Hwang, Gyeonggi-do (KR); JiHyun Jung, Gyeonggi-do (KR); DeukSu Lee, Gyeonggi-do (KR); SuChang An, Seoul (KR); Ruda Rhe, Seoul (KR); Yangsik Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 13 days.

(21) Appl. No.: 15/993,965

(22) Filed: May 31, 2018

(65) Prior Publication Data

US 2018/0348911 A1    Dec. 6, 2018

(30) Foreign Application Priority Data

Jun. 1, 2017    (KR) ......................... 10-2017-0068395

(51) Int. Cl.
*G06F 3/044*   (2006.01)
*G06F 3/041*   (2006.01)

(52) U.S. Cl.
CPC ............ *G06F 3/044* (2013.01); *G06F 3/0416* (2013.01); *G06F 3/0412* (2013.01); *G06F 2203/04107* (2013.01); *G06F 2203/04112* (2013.01)

(58) Field of Classification Search
CPC .............................. G06F 3/044; G06F 3/0416
See application file for complete search history.

(56) References Cited

U.S. PATENT DOCUMENTS

| | | | |
|---|---|---|---|
| 2010/0128000 A1* | 5/2010 | Lo | G06F 3/044 345/174 |
| 2017/0003792 A1* | 1/2017 | Berget | G06F 3/0416 |
| 2017/0090644 A1* | 3/2017 | Yao | G06F 3/0416 |
| 2017/0344186 A1* | 11/2017 | Na | G06F 3/0418 |

\* cited by examiner

*Primary Examiner* — Kevin M Nguyen
(74) *Attorney, Agent, or Firm* — Polsinelli PC

(57) ABSTRACT

Disclosed is related to a touch display device and a touch panel and, more specifically, relate to a touch display device and a touch panel having a structure capable of reducing a deviation of the parasitic capacitance, which is generated in touch sensor metals, such as touch electrodes or touch lines. According to the aspects of the disclosure, it is possible to reduce a parasitic capacitance deviation, thereby improving touch sensitivity.

14 Claims, 27 Drawing Sheets

Mesh Type TE

Mesh Type TE

TOUCH DISPLAY DEVICE AND TOUCH PANEL

CROSS REFERENCE TO RELATED APPLICATION

This application claims priority from Korean Patent Application No. 10-2017-0068395, filed on Jun. 1, 2017, which is hereby incorporated by reference for all purposes as if fully set forth herein.

BACKGROUND

Field of the Disclosure

The present disclosure relates to a display device, and more particularly, to a touch display device and a touch panel.

Description of the Background

Development of the information society has brought about growing demands for various types of display devices for displaying images. Recently, various display devices, such as a liquid crystal display device, a plasma display device, and an organic light-emitting display device, have been utilized.

Some of the display devices provide a touch-based input method that allows a user to easily input information or commands intuitively and conveniently by replacing conventional input methods such as buttons, a keyboard, or a mouse.

In order to provide such a touch-based input method, the touch display device must recognize the execution or non-execution of a user's touch, and must accurately detect touch coordinates.

To this end, a capacitance-based touch sensing method for detecting the execution or non-execution of a touch and touch coordinates based on a change in the capacitance generated in a plurality of touch electrodes formed on a touch panel is widely used among various touch sensing methods.

Since a plurality of touch electrodes are complicatedly arranged in a touch panel of a conventional touch display device, there is a problem in which undesired parasitic capacitance is generated due to an electrode pattern structure of a touch panel or a display panel having the touch panel embedded therein.

In addition, a great deal of deviation in the parasitic capacitance, which is generated in touch sensor metals, such as touch electrodes or touch lines, occurs depending on an arrangement of the touch electrodes or touch lines in the touch panel, thereby sharply degrading touch sensitivity.

SUMMARY

Accordingly, the present disclosure is to provide a touch display device and a touch panel having a structure capable of reducing a deviation of the parasitic capacitance, which is generated in touch sensor metals, such as touch electrodes or touch lines, regardless of the arrangement of the touch sensor metals, such as touch electrodes or touch lines, in the touch panel.

Another aspect of the present disclosure is to provide a touch display device and a touch panel having a structure capable of reducing a deviation of the parasitic capacitance, which is generated in touch sensor metals, such as touch electrodes or touch lines, even when there are differences in length between the touch lines.

Another aspect of the present disclosure is to provide a touch display device and a touch panel having a parasitic capacitance deviation reduction structure in a non-active area corresponding to an image non-display area.

Another aspect of the present disclosure is to provide a touch display device and a touch panel having a parasitic capacitance deviation reduction structure in an active area corresponding to an image display area.

Aspects of the present disclosure may provide a touch display device including: a touch panel configured to have a plurality of touch electrodes and a plurality of touch lines electrically connected to all or some of the plurality of touch electrodes; and a touch circuit configured to drive the touch panel to thus sense the execution or non-execution of a touch or a touch position.

Each of the plurality of touch electrodes may be an electrode metal that is patterned in the form of a mesh to have openings.

At least one dummy metal, which is disconnected from the electrode metal, may exist in an area of all or some of the plurality of touch electrodes.

The plurality of touch lines may include a first touch line and a second touch line, which have different lengths.

The presence or absence of a dummy metal in an area of a first touch electrode electrically connected to the first touch line may be different from the presence or absence of a dummy metal in an area of a second touch electrode electrically connected to the second touch line.

Alternatively, the ratio of an area occupied by the dummy metals to an area of a first touch electrode electrically connected to the first touch line may be different from the ratio of an area occupied by the dummy metals to an area of a second touch electrode electrically connected to the second touch line.

The touch panel may be provided inside or outside a display panel including an active area in which an image is displayed and a non-active area outside the active area.

The plurality of touch electrodes may exist to correspond to the active area and the plurality of touch lines may exist to correspond to the non-active area.

The first touch line may be longer than the second touch line, a dummy metal may exist in the area of the first touch electrode electrically connected to the first touch line, and no dummy metal may exist in the area of the second touch electrode electrically connected to the second touch line.

The first touch line may be longer than the second touch line, and the ratio of the area occupied by the dummy metals to the area of the first touch electrode electrically connected to the first touch line may be greater than the ratio of the area occupied by the dummy metals to the area of the second touch electrode electrically connected to the second touch line.

Respective openings existing in the areas of the respective touch electrodes may correspond to light-emitting portions of one or more subpixels.

Aspects of the present disclosure may provide a touch panel including a plurality of touch electrodes and a plurality of touch lines electrically connected to all or some of the plurality of touch electrodes.

Each of the plurality of touch electrodes is an electrode metal that is patterned in the form of a mesh so as to have openings.

At least one dummy metal, which is disconnected from the electrode metal, may exist in the area of all or some of the plurality of touch electrodes.

The plurality of touch lines may include a first touch line and a second touch line, which have different lengths.

The presence or absence of a dummy metal in the area of the first touch electrode electrically connected to the first touch line may be different from the presence or absence of a dummy metal in the area of the second touch electrode electrically connected to the second touch line.

Alternatively, the ratio of an area occupied by the dummy metals to an area of a first touch electrode electrically connected to the first touch line may be different from the ratio of an area occupied by the dummy metals to an area of a second touch electrode electrically connected to the second touch line.

The electrode metal and the dummy metal may be positioned in the same layer.

According to the aspects of the present disclosure described above, it is possible to provide a touch display device and a touch panel having a structure capable of reducing a deviation of the parasitic capacitance, which is generated in touch sensor metals, such as touch electrodes or touch lines, regardless of the arrangement of the touch sensor metals, such as touch electrodes or touch lines, in the touch panel.

In addition, according to aspects of the present disclosure, it is possible to provide a touch display device and a touch panel having a structure capable of reducing a deviation of the parasitic capacitance, which is generated in touch sensor metals, such as touch electrodes or touch lines, even when there are differences in length between the touch lines.

In addition, according to aspects of the present disclosure, it is possible to provide a touch display device and a touch panel having a parasitic capacitance deviation reduction structure in an non-active area corresponding to an image non-display area.

Further, according to aspects of the present disclosure, it is possible to provide a touch display device and a touch panel having a parasitic capacitance deviation reduction structure in an active area corresponding to an image display area.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
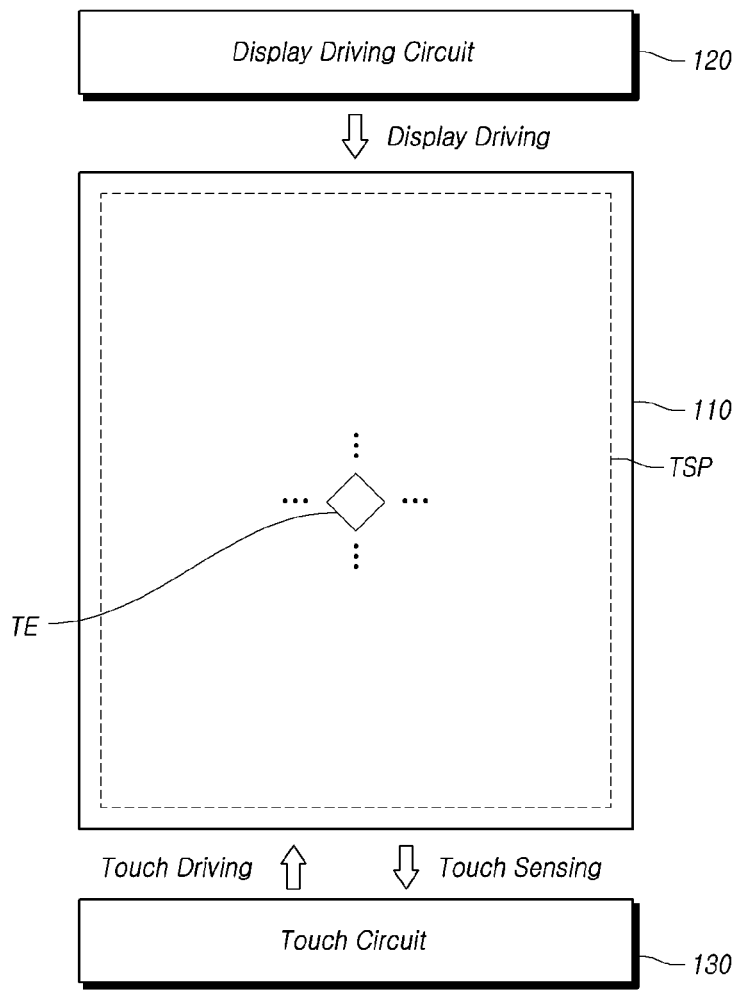
FIG. 1 is a system configuration diagram of a touch display device according to aspects of the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a system configuration diagram of a touch display device 100 according to aspects of the present disclosure.

Referring to FIG. 1, the touch display device 100 according to aspects of the present disclosure may provide an image display function for displaying images and a touch sensing function for sensing a user touch.

The touch display device 100 according to aspects of the present disclosure may include a display panel 110 having data lines and gate lines arranged therein for image display, a display driving circuit 120 for driving the display panel 110, and the like.

The display driving circuit 120, in terms of a function, may include a data driving circuit for driving the data lines, a gate driving circuit for driving the gate lines, a controller for controlling the data driving circuit and the gate driving circuit, and the like.

The display driving circuit 120 may be implemented as one or more integrated circuits.

The touch display device 100 according to aspects of the present disclosure may include a touch panel (TSP) having a plurality of touch electrodes (TE) arranged as a touch sensor for touch sensing and a plurality of touch lines (TL) electrically connected to all or some of the plurality of touch electrodes (TE) and a touch circuit 130 for sensing execution or non-execution of a touch or a touch position by driving the touch panel (TSP).

The touch circuit 130 supplies a touch driving signal to the touch panel (TSP) to drive the touch panel (TSP) and detects a touch sensing signal from the touch panel (TSP), thereby sensing execution or non-execution of a touch and/or a touch position (touch coordinates).

The touch circuit 130 may be implemented to include a touch driving circuit for supplying a touch driving signal and receiving a touch sensing signal and a touch controller for calculating execution or non-execution of a touch and/or a touch position (touch coordinates). Here, the touch driving signal may be a DC signal having a constant voltage value, or may be an AC signal having a predetermined amplitude, which swings between a high level and a low level and includes a plurality of pulses.

The touch circuit 130 may be implemented as one or more components (e.g., an integrated circuit), and may be implemented separately from the display driving circuit 120.

In addition, the whole or a part of the touch circuit 130 may be implemented to be integrated with the display driving circuit 120 or an internal circuit thereof. For example, the touch driving circuit of the touch circuit 130 may be implemented as an integrated circuit along with a data driving circuit of the display driving circuit 120.

Meanwhile, the touch display device 100 according to aspects of the present disclosure may sense a touch based on capacitance generated in the touch electrodes (TE).

The touch display device 100 according to aspects of the present disclosure may sense a touch by means of a mutual-capacitance-based touch sensing method or by means of a self-capacitance-based touch sensing method, which is a capacitance-based touch sensing method.

In the case of a mutual-capacitance-based touch sensing method, a plurality of touch electrodes (TE) may be divided into driving touch electrodes (also referred to as driving electrodes, transmitting electrodes, or driving lines) to which a touch driving signal is applied and sensing touch electrodes (also referred to as sensing electrodes, receiving electrodes, or sensing lines) that sense a touch sensing signal and generate capacitance along with driving electrodes.

Among the driving touch electrodes of the touch electrodes (TE), the driving touch electrodes disposed in the same row (or in the same column) are electrically connected to each other to thus constitute one driving touch electrode line.

Among the sensing touch electrodes of the touch electrodes (TE), the sensing touch electrodes disposed in the same column (or in the same row) are electrically connected to each other to thus constitute one sensing touch electrode line.

In the case of the mutual-capacitance-based touch sensing method described above, execution or non-execution of a touch and/or touch coordinates are detected based on a change in the capacitance (mutual-capacitance) between a driving touch electrode (driving touch electrode line) and a sensing touch electrode (sensing touch electrode line) depending on the presence or absence of a pointer such as a finger or a pen.

In the case of the self-capacitance-based touch sensing method, each touch electrode (TE) plays the role of both the driving touch electrode (applying a touch driving signal) and the sensing touch electrode (detecting a touch sensing signal).

That is, a touch driving signal is applied to each touch electrode (TE), and a touch sensing signal is received through the touch electrode (TE) to which the touch driving signal has been applied. Therefore, in the self-capacitance-based touch sensing method, there is no distinction between the driving electrode and the sensing electrode.

In the case of the self-capacitance-based touch sensing method, execution or non-execution of a touch and/or touch coordinates are detected based on a change in the capacitance between a pointer, such as a finger or a pen, and a touch electrode (TE).

As described above, the touch display device 100 according to aspects of the present disclosure may sense a touch by means of the mutual-capacitance-based touch sensing method or by means of the self-capacitance-based touch sensing method.

Hereinafter, although an improved structure for enhancing the touch sensitivity will be described with respect to a touch display device 100 and a touch panel (TSP) that adopt a mutual-capacitance-based touch sensing method for the convenience of explanation, the improved structure for enhancing the touch sensitivity may be applied to a touch display device 100 and a touch panel (TSP) adopting a self-capacitance-based touch sensing method in the same manner.

In addition, the display panel 110 of the touch display device 100 according to aspects of the present disclosure may be various types of display devices such as an organic light-emitting diode panel (OLED panel), a liquid crystal display panel (LCD panel), and the like. Hereinafter, the description will be mainly made of, as an example, an organic light-emitting diode panel (OLED panel) for the convenience of explanation.

Figure 2:
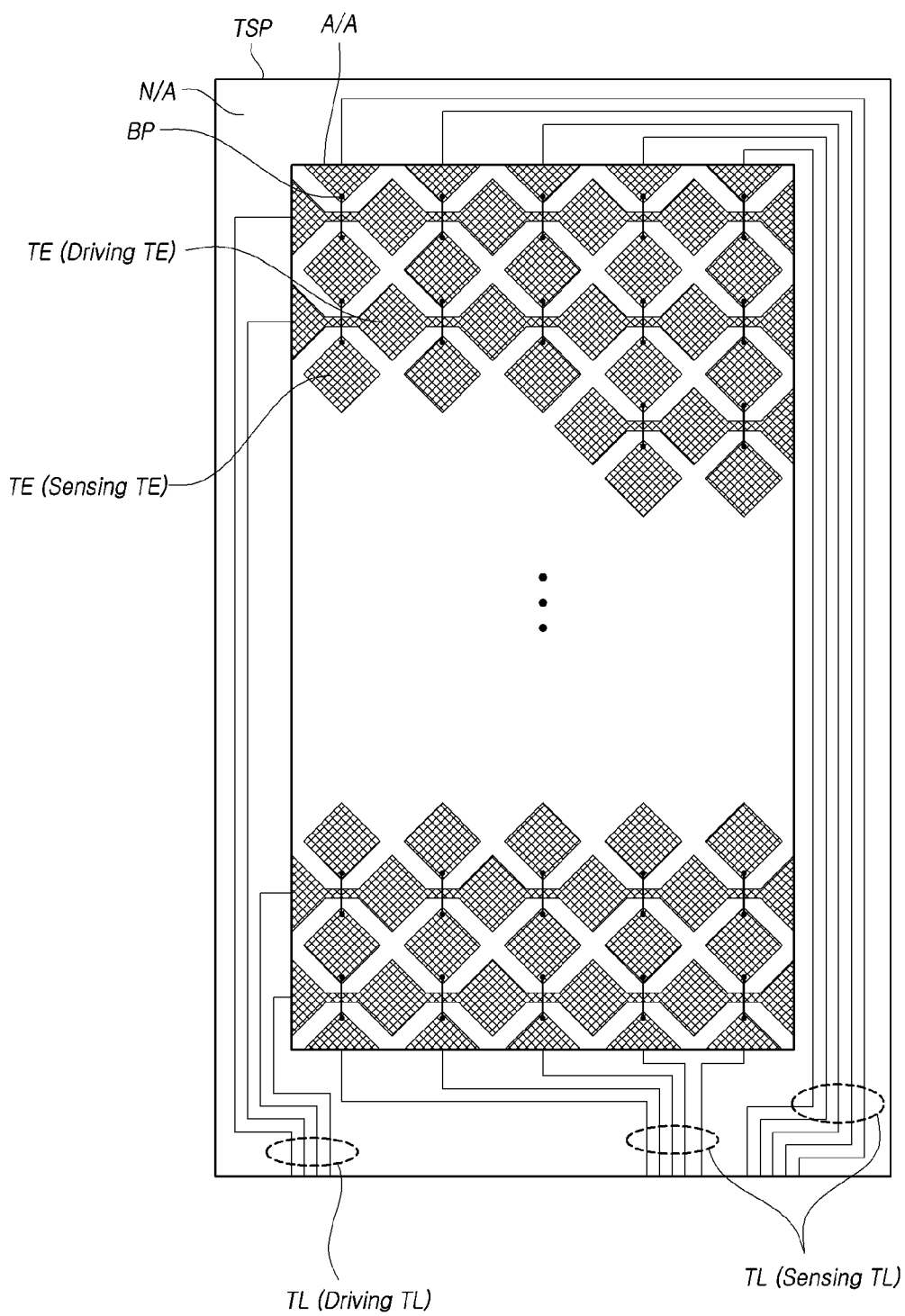
FIG. 2 is a view illustrating a touch panel according to aspects of the present disclosure.
Figure 3:
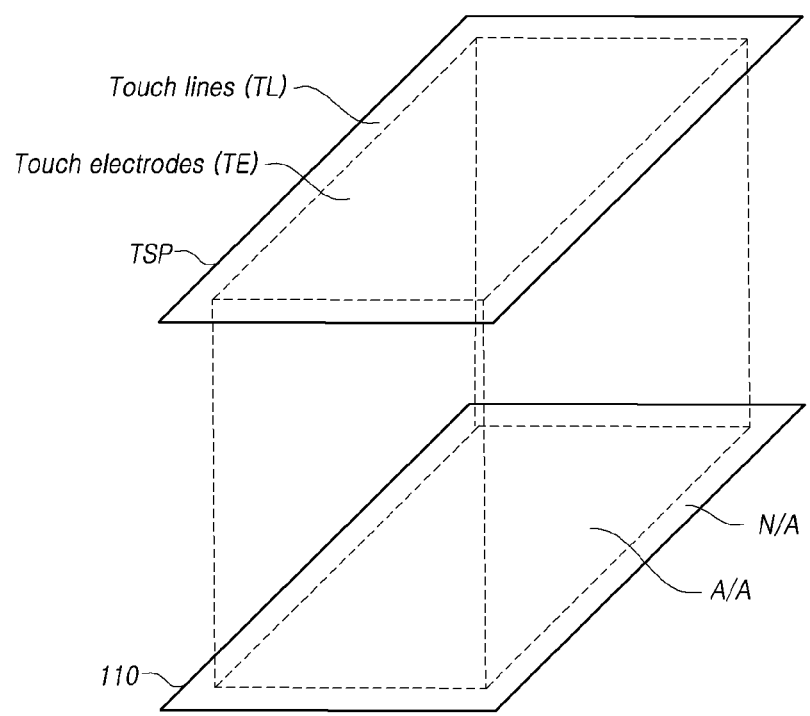
FIG. 3 is a view illustrating a relationship between areas of a display panel and a touch panel according to aspects of the present disclosure.

FIG. 2 is a view illustrating a touch panel (TSP) according to aspects of the present disclosure. FIG. 3 is a view illustrating a relationship between areas of a display panel 110 and a touch panel (TSP) according to aspects of the present disclosure.

The touch panel (TSP) illustrated in FIG. 2 is intended for mutual-capacitance-based touch sensing.

Referring to FIG. 2, a plurality of touch electrodes (TE) may be disposed on the touch panel (TSP), and touch lines (TL) for electrically connecting the touch electrodes (TE) to the touch circuit 130 may be disposed thereon.

The touch lines (TL) may be electrically connected to touch electrodes (TE) positioned in outermost areas, among the touch electrodes (TE). Hereinafter, the touch electrodes (TE) positioned in outermost areas will be also referred to as "outermost touch electrodes (O-TE)".

In addition, the touch panel (TSP) may have touch pads that are in contact with the touch circuit 130 in order to electrically connect the touch lines (TL) to the touch circuit 130.

The touch electrodes (TE) and the touch lines (TL) may be provided in the same layer, or may be provided in different layers.

In the case where the above-described touch display device 100 adopts a mutual-capacitance-based touch sensing method, two or more touch electrodes (TE) disposed in the same row (or in the same column) may be electrically connected to each another to thus constitute one driving touch electrode line (Driving TE Line). Two or more touch electrodes (TE) disposed in the same column (or in the same row) may be electrically connected to each other to thus constitute one sensing touch electrode line (Sensing TE Line).

Two or more touch electrodes constituting one driving touch electrode line (Driving TE Line) may be integrated to be electrically connected, or may be electrically connected by bridges.

Two or more touch electrodes (TE) constituting one sensing touch electrode line (Sensing TE Line) may be integrated to be electrically connected, or may be electrically connected by bridges.

FIG. 2 shows an example in which two or more touch electrodes (TE) constituting one driving touch electrode line (Driving TE Line) are integrated to be electrically connected and two or more touch electrodes (TE) constituting one sensing touch electrode line (Sensing TE Line) are electrically connected by bridges (BP).

Here, two or more touch electrodes (TE) constituting one driving touch electrode line (Driving TE Line) are referred to as "driving touch electrodes (Driving TE)". Two or more touch electrodes (TE) constituting one sensing touch electrode line (Sensing TE Line) are referred to as "sensing touch electrodes (Sensing TE)".

Each driving touch electrode line may be connected to at least one touch line (TL), and each sensing touch electrode line may be connected to at least one touch line (TL).

At least one touch line (TL) connected to each driving touch electrode line is referred to as a driving touch line (Driving TL). At least one touch line (TL) connected to each sensing touch electrode line is referred to as a sensing touch line (Sensing TL).

The respective touch lines (TL) may be connected to one touch pad (TP).

Referring to FIG. 2, the respective touch electrodes (TE), for example, may have a rhombus shape, or, in some cases, may have a rectangular shape (may include a square). In addition, the respective touch electrodes (TE) may have various shapes.

The shape of the touch electrode (TE) may be variously designed in consideration of the display performance and the touch performance of the touch display device 100.

Although the touch panel (TSP) shown in FIG. 2 extends long in the column direction, the touch panel (TSP) may be designed so as to extend long in the row direction according to the type of the touch display device 100 (e.g., a TV set, a monitor, a mobile terminal, etc.) or design thereof.

The touch panel (TSP) according to aspects of the present disclosure may be provided outside the display panel 110 (an external-type touch panel), or may be provided inside the display panel 110 (an internal-type touch panel).

In the case of an external-type touch panel (TSP), the touch panel (TSP) and the display panel 110 may be separately manufactured through different panel manufacturing processes, and thereafter, may be bonded to each other.

In the case of an internal-type touch panel (TSP), the touch panel (TSP) and the display panel 110 may be produced together through a single panel manufacturing process.

In the case of an internal-type touch panel (TSP), the touch panel (TSP) may be regarded as a group of a plurality of touch electrodes (TE). Here, a plate on which the plurality of touch electrodes (TE) are placed may be a dedicated substrate, or may be an existing layer (e.g., an encapsulation layer) of the display panel 110.

Referring to FIGS. 2 and 3, the display panel 110 may include an active area (A/A) in which an image is displayed and a non-active area (N/A), which is an area outside the active area (A/A). Here, the active area (A/A) is also referred to as a "display area", and the non-active area (N/A) is also referred to as a "non-display area".

A plurality of subpixels defined by data lines and gate lines may be arranged in the active area (A/A).

There may be lines and pads in the non-active area (A/A), which connect the data lines, the gate lines, and various signal lines in the active area (A/A) to the display driving circuit 120.

A plurality of touch electrodes (TE) and a plurality of touch lines (TL) may be disposed on the touch panel (TSP).

The plurality of touch electrodes (TE) may be positioned to correspond to the active area (A/A) of the display panel 110.

The plurality of touch lines (TL) may be positioned to correspond to the non-active area (N/A) of the display panel 110.

That is, the plurality of touch lines (TL) are provided on the periphery of the touch electrode area {the active area (A/A) or its corresponding area) where a plurality of touch electrodes (TE) are disposed.

The touch panel (TSP) may be provided inside or outside the display panel 110.

As described above, the touch electrodes (TE) are disposed in the active area (A/A) of the display panel 110, and the touch lines (TL) are disposed in the non-active area (N/A) of the display panel 110, thereby providing a touch sensing function matching the screen display state.

Referring to FIG. 2, the respective touch lines (TL) are electrically connected to the touch circuit 130.

One end of each driving touch line (Driving TL) of the plurality of touch lines (TL) is electrically connected to each driving channel of the touch circuit 130, and the opposite end thereof is electrically connected to an outermost touch electrode disposed in the outermost area, among the touch electrodes (TE) included in the corresponding driving touch electrode line (Driving TE Line).

One end of each sensing touch line (Sensing TL) of the plurality of touch lines (TL) is electrically connected to each sensing channel of the touch circuit 130, and the opposite end thereof is electrically connected to an outermost touch electrode disposed in the outermost area, among the touch electrodes (TE) included in the corresponding sensing touch electrode line (Sensing TE Line).

As shown in FIG. 2, a plurality of touch lines (TL) may have different lengths. That is, at least one of the plurality of touch lines (TL) may have a different length.

Accordingly, the respective touch lines (TL) may have different signal transmission characteristics or different electrical characteristics from each other.

Figure 4:
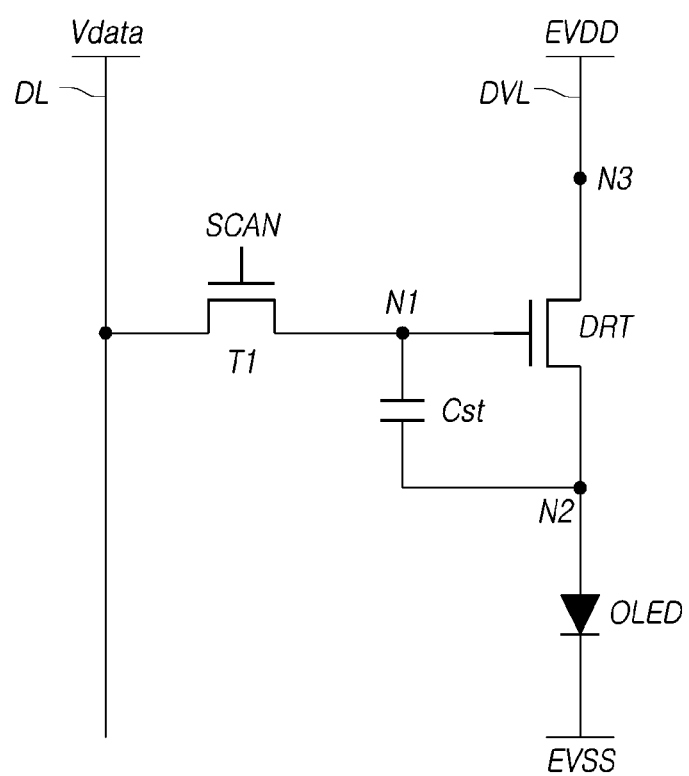
FIGS. 4 and 5 are exemplary diagrams of a subpixel structure of a touch display device according to aspects of the present disclosure.
Figure 5:
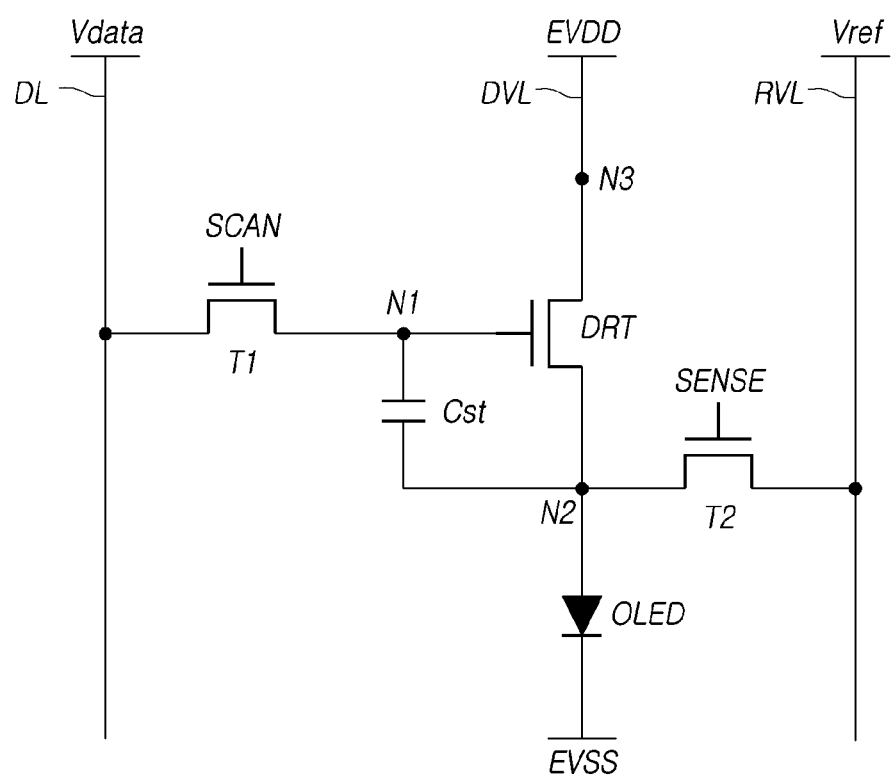

FIGS. 4 and 5 are exemplary diagrams of a subpixel structure of a touch display device 100 according to aspects of the present disclosure.

FIGS. 4 and 5 show examples of a subpixel structure in the case where a display panel 110 of the touch display device 100, according to aspects of the present disclosure, is an organic light-emitting display panel.

Referring to FIGS. 4 and 5, in the case where the touch display device 100 according to aspects of the present disclosure is an organic light-emitting display device, each subpixel may be configured to fundamentally include an organic light-emitting diode (OLED), a driving transistor (DRT) for driving the organic light-emitting diode (OLED), a first transistor (T1) for transmitting a data voltage to a first node (N1) corresponding to a gate node of the driving transistor (DRT), and a storage capacitor (Cst) for maintaining a data voltage corresponding to an image signal voltage or a voltage corresponding thereto for one frame time.

The organic light-emitting diode (OLED) may include a first electrode (e.g., an anode electrode or a cathode electrode), an organic layer, a second electrode (e.g., a cathode electrode or an anode electrode), and the like.

A base voltage (EVSS) may be applied to the second electrode of the organic light-emitting diode (OLED).

The driving transistor (DRT) drives the organic light-emitting diode (OLED) by supplying a driving current thereto.

The driving transistor (DRT) has a first node (N1), a second node (N2), and a third node (N3).

The first node (N1) of the driving transistor (DRT) corresponds to a gate node, and may be electrically connected to a source node or a drain node of the first transistor (T1).

The second node (N2) of the driving transistor (DRT) may be electrically connected to the first electrode of the organic light-emitting diode (OLED), and may be a source node or a drain node.

The third node (N3) of the driving transistor (DRT), to which a driving voltage (EVDD) is applied, may be electrically connected to a driving voltage line (DVL) for supplying the driving voltage (EVDD), and may be a drain node or a source node.

The first transistor (T1) may be electrically connected between a data line (DL) and the first node (N1) of the driving transistor (DRT), and may be controlled by a scan signal (SCAN) received at a gate node through the gate line.

The first transistor (T1) may be turned on by a scan signal (SCAN) to thus transfer a data voltage (Vdata) supplied from the data line (DL) to the first node (N1) of the driving transistor (DRT).

The storage capacitor (Cst) may be electrically connected between the first node (N1) and the second node (N2) of the driving transistor (DRT).

The storage capacitor (Cst) is not a parasitic capacitor (e.g., Cgs or Cgd), which is an internal capacitor generated between the first node (N1) and the second node (N2) of the driving transistor (DRT), but is an external capacitor outside the driving transistor (DRT), which is intentionally designed.

Figure 18:
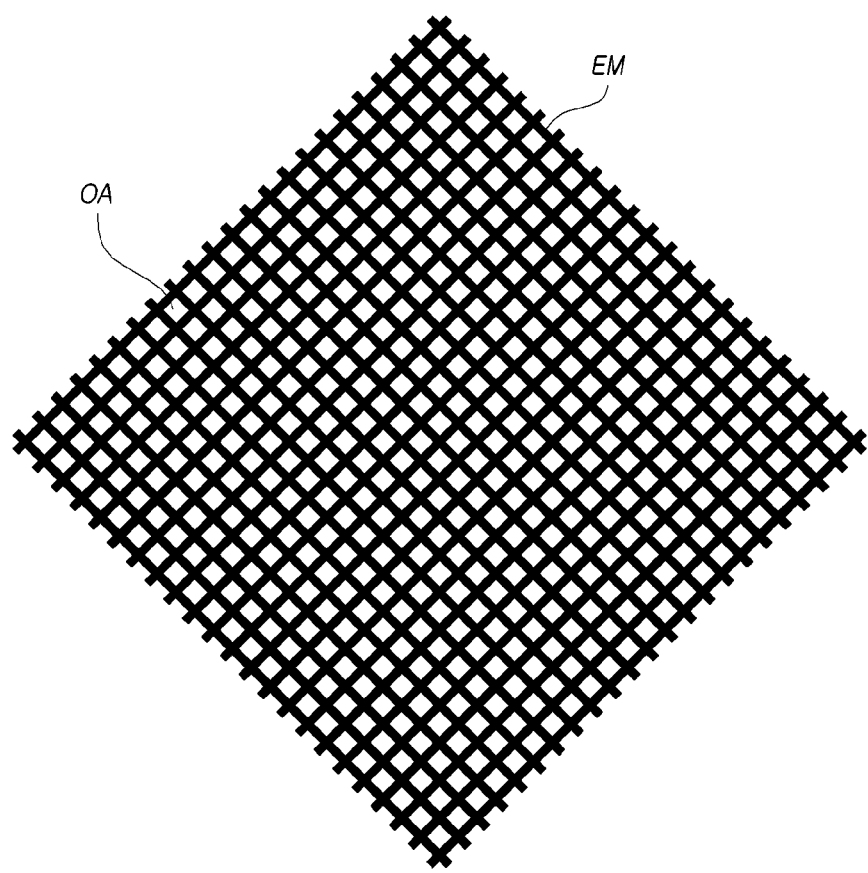
FIG. 18 is a view illustrating a mesh-type touch electrode in a touch display device according to aspects of the present disclosure.

The respective subpixels may further include a second transistor (T2), as shown in FIG. 18, in order to control a voltage of the second node (N2) of the driving transistor (DRT) or in order to sense characteristic values of the subpixel {e.g., a threshold voltage or mobility of the driving transistor (DRT), a threshold voltage of the organic light-emitting diode (OLED), and the like).

The second transistor (T2) may be electrically connected between the second node (N2) of the driving transistor (DRT) and a reference voltage line (RVL) for supplying a reference voltage (Vref), and may be controlled by receiving a sensing signal (SENSE), which is a kind of scan signal, through a gate node.

The second transistor (T2) is turned on by a sensing signal (SENSE) to thus apply a reference voltage (Vref) supplied through the reference voltage line (RVL) to the second node (N2) of the driving transistor (DRT).

In addition, the second transistor (T2) may be utilized as one of the voltage sensing paths for the second node (N2) of the driving transistor (DRT).

The scan signal (SCAN) and the sensing signal (SENSE) may be separate gate signals. In this case, the scan signal (SCAN) and the sensing signal (SENSE) may be applied to the gate node of the first transistor (T1) and the gate node of the second transistor (T2), respectively, through different gate lines.

In some cases, the scan signal (SCAN) and the sensing signal (SENSE) may be the same gate signal. In this case, the scan signal (SCAN) and the sensing signal (SENSE) may be commonly applied to the gate node of the first transistor (T1) and the gate node of the second transistor (T2) through the same gate line.

The driving transistor (DRT), the first transistor (T1), and the second transistor (T2) may be an n-type transistor or a p-type transistor, respectively.

Figure 6:
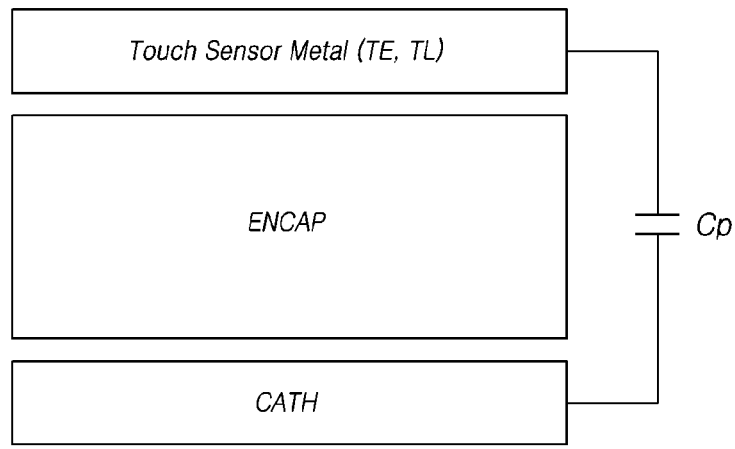
FIG. 6 is a diagram illustrating parasitic capacitance generated under a structure in which touch sensor metals are positioned on an encapsulation layer in a touch display device according to aspects of the present disclosure.

FIG. 6 is a diagram illustrating a parasitic capacitance generated under a structure in which touch sensor metals (TE) and (TL) are positioned on an encapsulation layer (ENCAP) in a touch display device 100 according to aspects of the present disclosure.

Referring to FIG. 6, in the touch display device 100 according to aspects of the present disclosure, the touch sensor metals (TE) and (TL) including the touch electrodes (TE), the touch lines (TL), and the like may be formed on an encapsulation layer (ENCAP).

A structure in which the touch sensor metals (TE) and (TL) are positioned on the encapsulation layer (ENCAP) is called a touch-on-encapsulation layer (TOE) structure.

In addition, a cathode (CATH) corresponding to the second electrode of the organic light-emitting diode (OLED) may be provided under the encapsulation layer (ENCAP).

A base voltage (EVSS) may be applied to the cathode (CATH).

Referring back to the TOE structure, the touch panel (TSP) may be embedded in the display panel 110, and the display panel 110 having the embedded touch panel (TSP) may include a cathode (CATH) and an encapsulation layer (ENCAP) positioned on the cathode (CATH). In addition, touch sensor metals including a plurality of touch electrodes (TE) and a plurality of touch lines (TL) may be placed on the encapsulation layer (ENCAP).

According to this TOE structure, the touch panel (TSP) may be effectively embedded in the display panel 110 corresponding to the organic light-emitting display panel.

The encapsulation layer (ENCAP) may be a composite layer in which a plurality of layers, such as an organic material, an inorganic material, and the like, are stacked.

In addition, the encapsulation layer (ENCAP) may be an insulation layer.

Accordingly, the encapsulation layer (ENCAP) interposed between the touch sensor metals (TE) and (TL), to which a predetermined voltage is applied by a touch driving signal or the like, and the cathode (CATH), to which a base voltage (EVSS) is applied, may play the role of a dielectric, and capacitance (Cp) may be generated between the touch sensor metals (TE) and (TL) and the cathode (CATH).

The capacitance (Cp) generated between the touch sensor metals (TE) and (TL) and the cathode (CATH) is not necessary for touch sensing, but is undesired parasitic capacitance.

Therefore, when the capacitance (Cp) is generated between the touch sensor metals (TE) and (TL) and the cathode (CATH), the touch sensitivity may be drastically degraded.

Meanwhile, the parasitic capacitance (Cp) may considerably vary for the respective touch channels (driving channels and sensing channels) depending on the differences in length between the touch lines (TL).

That is, a deviation of the parasitic capacitance (Cp) between the touch sensor metals (TE) and (TL) and the cathode (CATH) for the touch channels (driving channels and sensing channels) may be significantly increased depending on the differences in length between the touch lines (TL).

Accordingly, the touch sensitivity may vary with the touch channels (driving channels and sensing channels), thereby significantly deteriorating the touch sensing performance.

A problem caused by the length differences between the touch lines (TL) will be described with reference to FIGS. 7 and 8.

Figure 7:
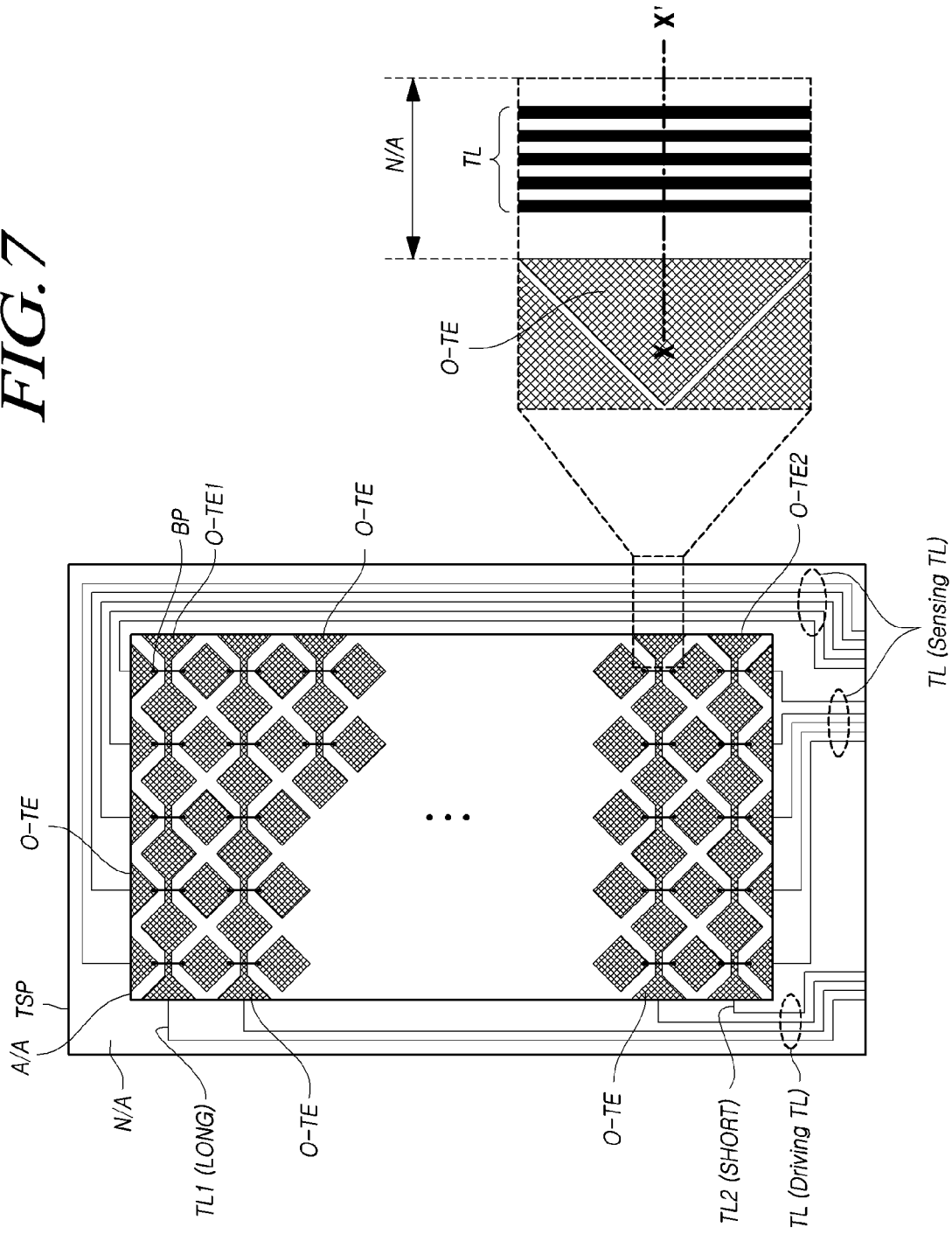
FIGS. 7 and 8 are a plan view and a cross-sectional view, respectively, illustrating an outermost touch electrode and a peripheral area thereof in a touch display device according to aspects of the present disclosure.
Figure 8:
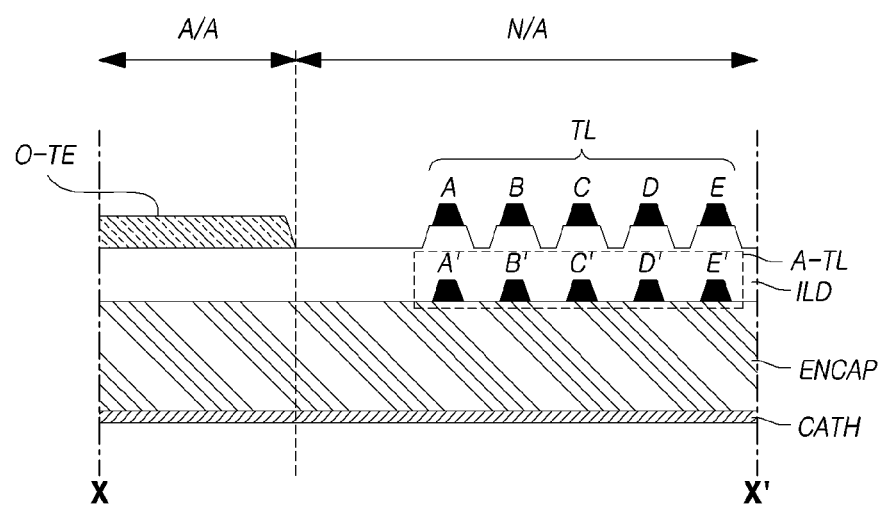

FIGS. 7 and 8 are a plan view and a cross-sectional view, respectively, illustrating an outermost touch electrode (O-TE) and a peripheral area thereof in a touch display device 100 according to aspects of the present disclosure.

Referring to FIG. 7, the plurality of touch electrodes (TE) have outermost touch electrodes (O-TE) disposed in the outermost areas.

The outermost touch electrodes (O-TE) may be smaller than the touch electrodes (TE) positioned inside the same.

In the example of FIG. 7, the size of the outermost touch electrode (O-TE) is approximately half the size of the rhombic touch electrode (TE) positioned inside the same.

All or some of the outermost touch electrodes (O-TE) are electrically connected to the touch lines (TL).

The respective driving touch electrode lines may be connected to one or more touch lines (TL). The respective sensing touch electrode lines may be connected to one or more touch lines (TL).

In the example of FIG. 7, one driving touch electrode line includes a plurality of touch electrodes (TE), which are formed in the row direction to be disposed in the same row and are integrally and electrically connected to each other, and is connected to one touch line (TL).

An outermost touch electrode (O-TE) positioned at one side, among the plurality of touch electrodes (TE) constituting one driving touch electrode line, is connected to one touch line (TL).

In the example of FIG. 7, one sensing touch electrode line includes a plurality of touch electrodes (TE), which are formed in the column direction to be disposed in the same column and are electrically connected to each other by bridges (BP), and is connected to two touch lines (TL).

Each of the outermost touch electrodes (O-TE) positioned at both sides, among the plurality of touch electrodes (TE) constituting one sensing touch electrode line, is connected to the touch line (TL).

Referring to FIG. 7, a plurality of touch electrodes (TE) may be provided in the active area (A/A). A plurality of touch lines (TL) may be provided in the non-active area (N/A).

FIG. 8 shows a cross-sectional view taken along the line X-X' in FIG. 7 illustrating enlargement of an area where one outermost touch electrode (O-TE) is positioned and a peripheral area thereof.

Referring to FIG. 8, an encapsulation layer (ENCAP) is positioned on the cathode (CATH).

An insulation layer (ILD) is positioned on the encapsulation layer (ENCAP).

An outermost touch electrode (O-TE) and touch lines (TL) A, B, C, D, and E are provided on the insulation layer (ILD).

The outermost touch electrode (O-TE) exists in the active area (A/A), and the touch lines (TL) A, B, C, D, and E exist in the non-active area (N/A).

Auxiliary touch lines (A-TL) A', B', C', D', and E' corresponding to the touch lines (TL) A, B, C, D, and E are positioned on the insulation layer (ILD).

In FIG. 8, five touch lines (TL) A, B, C, D, and E are separated from five auxiliary touch lines (A-TL) A', B', C', D', and E' by means of the insulation layer (ILD).

However, the five touch lines (TL) A, B, C, D, and E and the five auxiliary touch lines (A-TL) A', B', C', D', and E' are electrically connected at the points in which the five touch lines (TL) A, B, C, D, and E and the touch circuit 130 are connected or at the points in which the five touch lines (TL) A, B, C, D, and E and five outermost touch electrodes (O-TE) are connected.

A double wiring structure using five touch lines (TL) A, B, C, D, and E and five auxiliary touch lines (A-TL) A', B', C', D', and E' enables stable signal transmission.

Referring to FIG. 7, in the case where the touch circuit 130 is positioned at a lower end (a position at which the touch lines are gathered), the respective touch lines (TL) may have different lengths depending on the positions of the corresponding outermost touch electrodes (O-TE) connected thereto.

For example, the first outermost touch electrode (O-TE1) is electrically connected to the first touch line (TL1), and the second outermost touch electrode (O-TE2) is electrically connected to the second touch line (TL2).

The first touch line (TL1) is longer than the second touch line (TL2).

Thus, the parasitic capacitance (Cp) generated between touch sensor metals associated with the first touch line (TL1) and a cathode is greater than the parasitic capacitance (Cp)

generated between touch sensor metals associated with the second touch line (TL2) and a cathode.

The touch sensor metals associated with the first touch line (TL1) includes the first touch line (TL1) and touch electrodes (driving touch electrodes in the case of FIG. 7) constituting a touch electrode line (driving touch electrode line in the case of FIG. 7) electrically connected thereto.

The touch sensor metals related to the second touch line (TL2) includes the second touch line (TL2) and touch electrodes (driving touch electrodes in the case of FIG. 7) constituting a touch electrode line (driving touch electrode line in the case of FIG. 7) electrically connected thereto.

The deviation of the parasitic capacitance (Cp) due to the differences of the touch line lengths described above may cause an error in the touch sensing result.

Thus, the aspects of the present disclosure may provide a structure for reducing the parasitic capacitance deviation.

The parasitic capacitance deviation reduction structure of the aspects of the present disclosure may be applied to both the non-active area (N/A) and the active area (A/A).

Hereinafter, a parasitic capacitance deviation reduction structure in the non-active area (N/A) will be described first, and then a parasitic capacitance deviation reduction structure in the active area (A/A) will be described.

Figure 9:
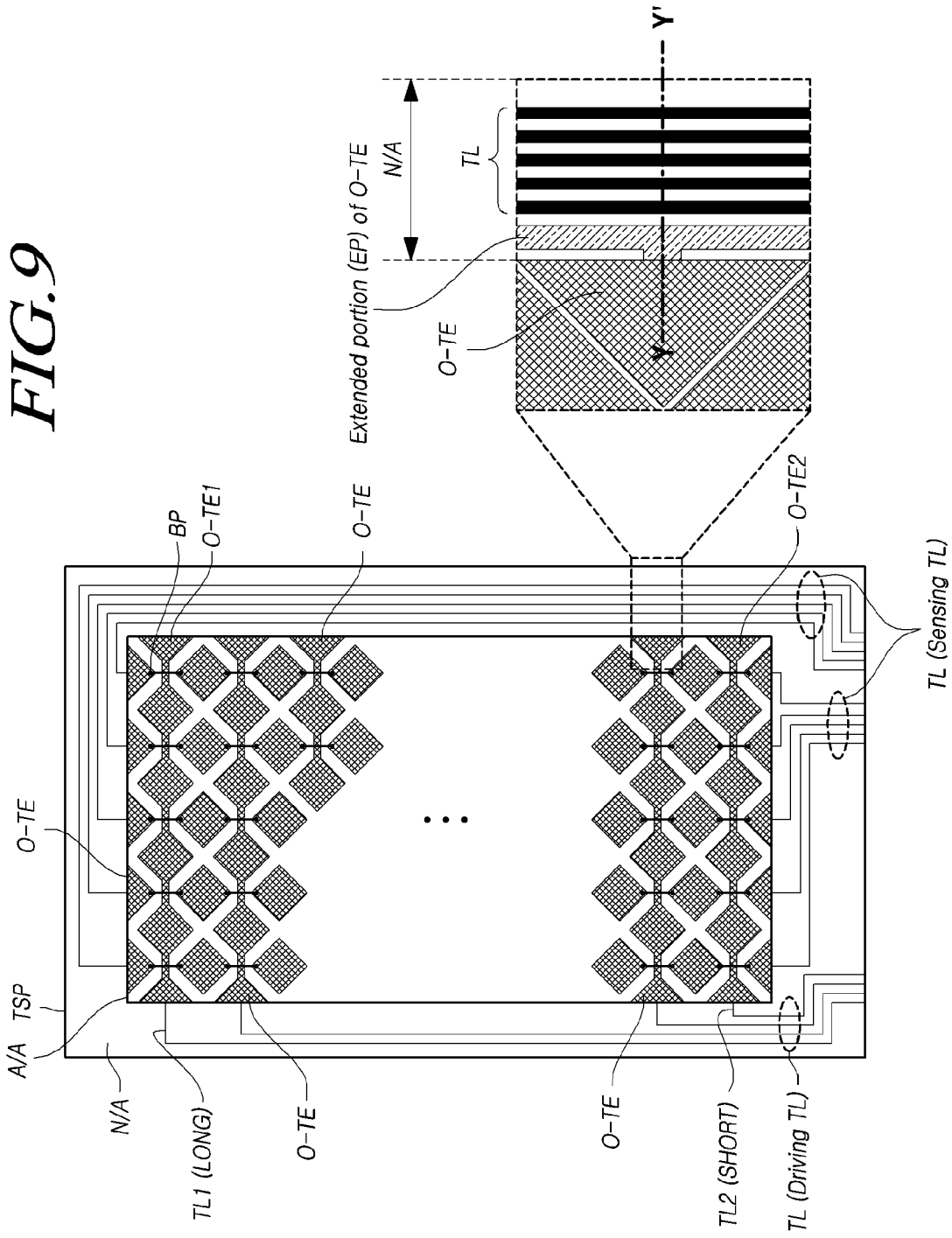
FIGS. 9 and 10 are a plan view and a cross-sectional view, respectively, for explaining a parasitic capacitance deviation reduction structure in a non-active area in a touch display device according to aspects of the present disclosure.
Figure 10:
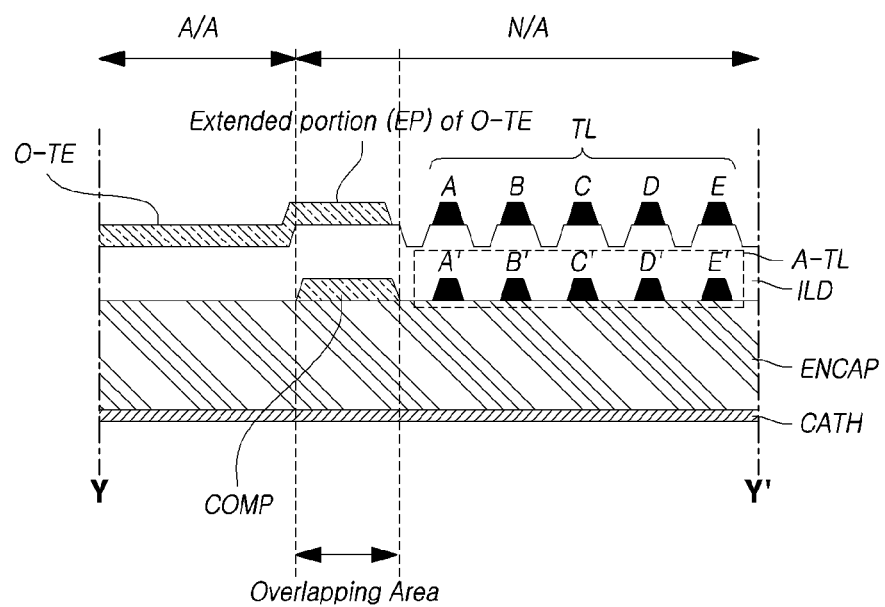
Figure 11:
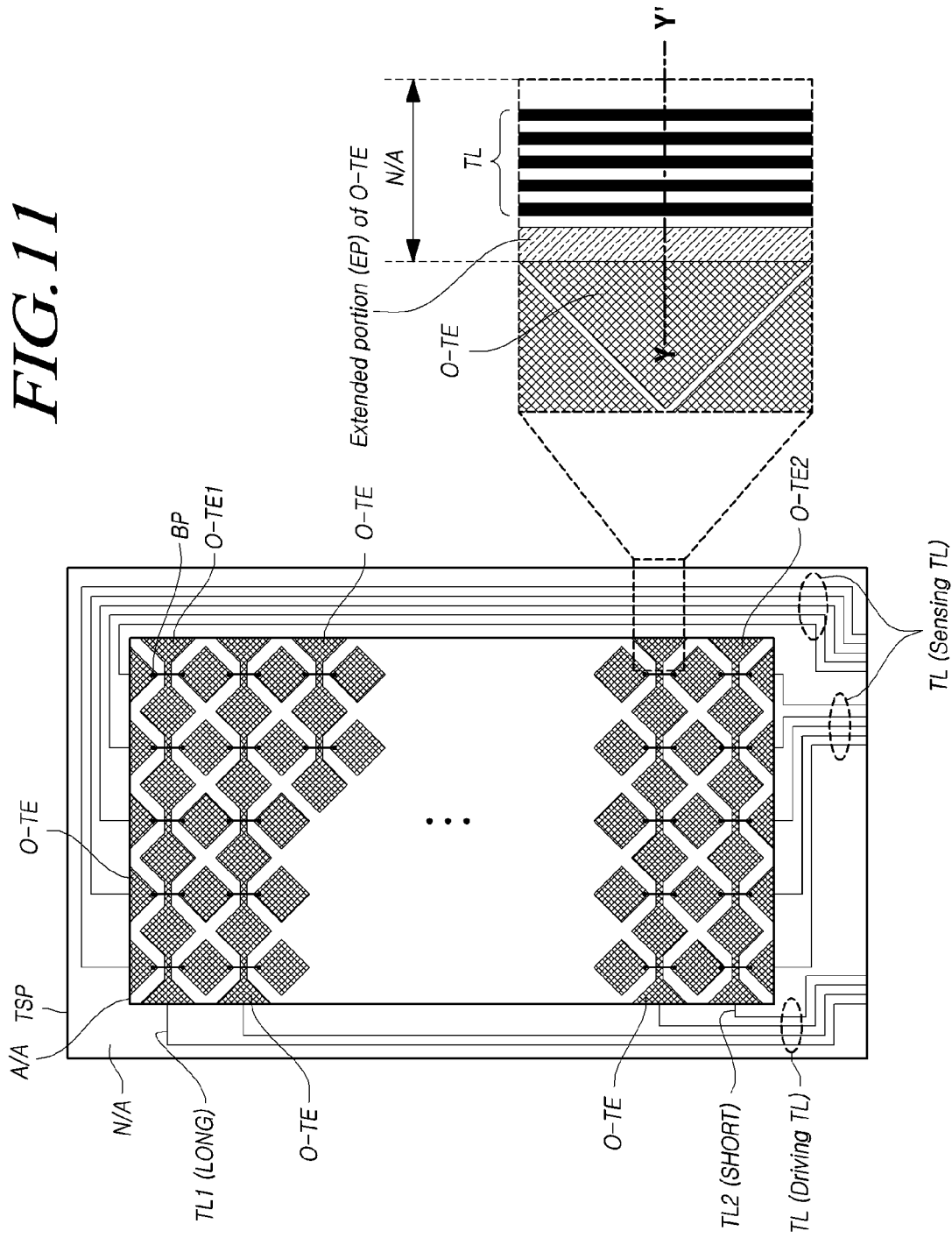
FIG. 11 is a view illustrating a modification for an extended portion of an outermost touch electrode when changing a structure in a non-active area in order to reduce a parasitic capacitance deviation in a touch display device according to aspects of the present disclosure.

FIGS. 9 and 10 are a plan view and a cross-sectional view, respectively, for explaining a parasitic capacitance deviation reduction structure in a non-active area (N/A) in a touch display device 100 according to aspects of the present disclosure. FIG. 11 is a view illustrating a modification for an extended portion of an outermost touch electrode (O-TE) when changing a structure in a non-active area (N/A) in order to reduce a parasitic capacitance deviation in a touch display device 100 according to aspects of the present disclosure.

Referring to FIGS. 9 and 10, the touch display device 100 according to aspects of the present disclosure may reduce the parasitic capacitance deviation by changing a structure in the non-active area (N/A).

That is, the touch display device 100 according to aspects of the present disclosure may have a parasitic capacitance deviation reduction structure in the non-active area (N/A).

In the touch display device 100 according to aspects of the present disclosure, as shown in FIG. 10, the parasitic capacitance deviation reduction structure in the non-active area (N/A) may be configured such that the touch panel (TSP) further includes a capacitance compensation pattern (COMP) that overlaps a portion of at least one outermost touch electrode (O-TE), among the plurality of touch electrodes (TE).

In the touch display device 100 according to aspects of the present disclosure, the parasitic capacitance deviation reduction structure in the non-active area (N/A) may further include a portion (EP) in which the outermost touch electrode (O-TE) is extended to the non-active area (N/A).

The portion (EP) in which the outermost touch electrode (O-TE) is extended to the non-active area (N/A) may be positioned to correspond to the capacitance compensation pattern (COMP) in the non-active area (N/A).

That is, the extended portion (EP) of the outermost touch electrode (O-TE) overlaps the capacitance compensation pattern (COMP) in the non-active area (N/A).

In the non-active area (N/A), the extended portion (EP) of the outermost touch electrode (O-TE) and the capacitance compensation pattern (COMP) may generate capacitance.

Hereinafter, the capacitance generated between the extended portion (EP) of the outermost touch electrode (O-TE) and the capacitance compensation pattern (COMP) will be referred to as "compensation capacitance".

The magnitude of the compensation capacitance may vary depending on the size of the overlapping area between the extended portion (EP) of the outermost touch electrode (O-TE) and the capacitance compensation pattern (COMP).

As the size of the overlapping area between the extended portion (EP) of the outermost touch electrode (O-TE) and the capacitance compensation pattern (COMP) is increased, the compensation capacitance may be increased as well. As the size of the overlapping area between the extended portion (EP) of the outermost touch electrode (O-TE) and the capacitance compensation pattern (COMP) is reduced, the compensation capacitance may be decreased.

The compensation capacitance between the extended portion (EP) of the outermost touch electrode (O-TE) and the capacitance compensation pattern (COMP) in the non-active area (N/A) is artificially generated to compensate for the parasitic capacitance deviation due to the differences of the touch line lengths, and may vary with the outermost touch electrode (O-TE).

Therefore, in order to compensate for the deviation of the parasitic capacitance (Cp) caused by the length differences of the electrically connected touch lines (TL), the size of the overlapping area between the extended portion (EP) of the outermost touch electrode (O-TE) and the capacitance compensation pattern (COMP) is designed to be different for each outermost touch electrode (O-TE). Accordingly, it is possible to compensate for the parasitic capacitance deviation by configuring the artificial compensation capacitance generated between the extended portion (EP) of the outermost touch electrode (O-TE) and the capacitance compensation pattern (COMP) to be different from each other.

In the case where the parasitic capacitance (Cp) is large because the touch line (TL) is short, the overlapping area between the extended portion (EP) of the outermost touch electrode (O-TE), which is electrically connected to the short touch line (TL), and the capacitance compensation pattern (COMP) is designed to be small, thereby generating a small amount of compensation capacitance.

In the case where the parasitic capacitance (Cp) is small because the touch line (TL) is long, the overlapping area between the extended portion (EP) of the outermost touch electrode (O-TE), which is electrically connected to the long touch line (TL), and the capacitance compensation pattern (COMP) is designed to be large, thereby generating a large amount of compensation capacitance.

According to the above description, the outermost touch electrode (TE) is extended to the non-active area (N/A), the capacitance compensation pattern (COMP) is additionally formed to overlap the extended portion (EP), and the overlapping area between the extended portion (EP) of the outermost touch electrode (O-TE) and the capacitance compensation pattern (COMP) is designed to have different sizes, thereby eliminating or reducing the parasitic capacitance deviation caused by the length differences of the touch lines (TL).

As described above, the capacitance compensation pattern (COMP) is positioned to correspond to the non-active area (N/A) outside the active area (A/A).

In one or more outermost touch electrodes (O-TE), a portion that does not overlap the capacitance compensation pattern (COMP) is positioned to correspond to the active area (A/A), and a portion that overlaps the capacitance compensation pattern (COMP) is positioned to correspond to the non-active area (N/A).

The parasitic capacitance deviation caused by the length differences of the touch lines (TL) may be compensated for in the non-active area (N/A).

Referring to FIG. 10, in the case where the touch panel (TSP) is embedded in the display panel 110, the display panel 110 having the embedded touch panel (TSP) may include a cathode (CATH), an encapsulation layer (ENCAP) positioned on the cathode (CATH), and an insulation layer (ILD) positioned on the encapsulation layer (ENCAP).

Touch sensor metals including a plurality of touch electrodes (TE) and a plurality of touch lines (TL) are positioned on the insulation layer (ILD).

A capacitance compensation pattern (COMP) is interposed between the encapsulation layer (ENCAP) and the insulation layer (ILD).

According to the cross-sectional structure described above, a parasitic capacitance reduction structure may be effectively configured in the non-active area (N/A) under the TOE structure.

Referring to FIG. 10, five touch lines (TL) A, B, C, D, and E are separated from five auxiliary touch lines (A-TL) A', B', C', D', and E' by means of an insulation layer (ILD).

However, the five touch lines (TL) A, B, C, D, and E and the five auxiliary touch lines (A-TL) A', B', C', D', and E' are electrically connected at the points in which the five touch lines (TL) A, B, C, D, and E and the touch circuit 130 are connected or at the points in which the five touch lines (TL) A, B, C, D, and E and five outermost touch electrodes (O-TE) are connected.

A double wiring structure using the five touch lines (TL) A, B, C, D, and E and the five auxiliary touch lines (A-TL) A', B', C', D', and E' enables stable signal transmission.

Referring to FIG. 9, an extended portion (EP) of the outermost touch electrode (O-TE) may be configured as an electrode metal (EM), instead of a mesh form.

That is, the extended portion (EP) of the outermost touch electrode (O-TE) may not have openings (OA).

A connecting portion between the outermost touch electrode (O-TE) in the active area (A/A) and the extended portion (EP) in the non-active area (N/A) may be narrow as shown in FIG. 9.

That is, only a part of the extended portion (EP) in the non-active area (N/A) may be connected to the outermost touch electrode (O-TE) in the active area (A/A).

Alternatively, as shown in FIG. 11, the extended portion (EP) in the non-active area (N/A) may be connected, as a whole, to the outermost touch electrode (O-TE) in the active area (A/A).

That is, the whole of the outermost touch electrode (O-TE) may be extended from the active area (A/A) to the non-active area (N/A).

Figure 12:
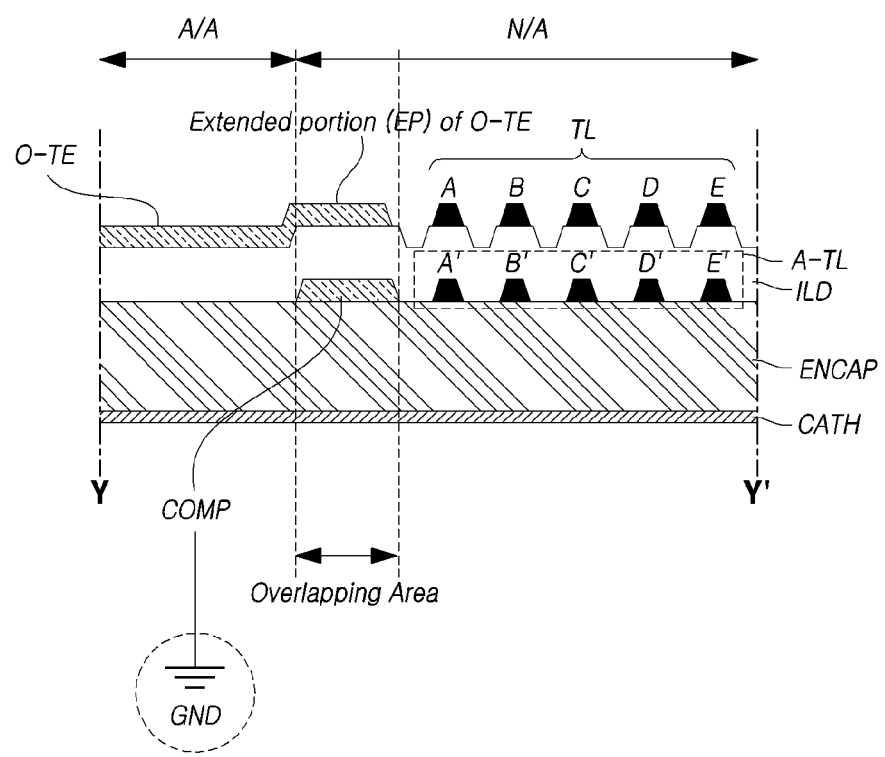
FIG. 12 is a view illustrating the case where a capacitance compensation pattern overlapping an extended portion of an outermost touch electrode is a ground pattern according to a structure changed in a non-active area in order to reduce a parasitic capacitance deviation in a touch display device according to aspects of the present disclosure.

FIG. 12 is a view illustrating the case where a capacitance compensation pattern (COMP) overlapping an extended portion (EP) of an outermost touch electrode (O-TE) is a ground pattern according to a changed structure in a non-active area (N/A) in order to reduce a parasitic capacitance deviation in a touch display device 100 according to aspects of the present disclosure.

Referring to FIG. 12, the capacitance compensation pattern (COMP) overlapping the extended portion (EP) of the outermost touch electrode (O-TE) may be a ground pattern to which a ground voltage (GND) is applied. Alternatively, the capacitance compensation pattern (COMP) may have a voltage level different from the voltage (the voltage of a touch driving signal or touch sensing signal) applied to the outermost touch electrode (O-TE) (which may be a driving touch electrode or a sensing touch electrode).

Here, the ground voltage applied to the cathode (CATH) may be a ground voltage (GND).

Therefore, the compensation capacitance for eliminating the parasitic capacitance deviation may be effectively generated. When the capacitance compensation pattern (COMP) is a ground voltage pattern, the capacitance compensation pattern (COMP) may also be utilized as an electrostatic discharge path in the touch panel (TSP) or the display panel 110.

The extended portion (EP) of the outermost touch electrode (O-TE) may be provided in the non-active area (N/A), or may be provided in the active area (A/A).

Therefore, the capacitance compensation pattern (COMP) may be provided in the non-active area (N/A), or may be provided in the active area (A/A).

In the case where the extended portion (EP) of the touch electrode (O-TE) is provided in the non-active area (N/A), the extended portion (EP) of the outermost touch electrode (O-TE) may not have openings (OA) corresponding to open areas. That is, the extended portion (EP) of the outermost touch electrode (O-TE) may be an electrode metal (EM) that is not patterned in the form of a mesh.

Hereinafter, the parasitic capacitance deviation reduction structure in the non-active area (N/A) described above will be described with reference to an example for eliminating the parasitic capacitance deviation caused by the length difference between the first touch line (TL1) electrically connected to the first outermost touch electrode (O-TE1) and the second touch line (TL2) electrically connected to the second outermost touch electrode (O-TE2) in FIG. 7.

The capacitance compensation pattern (COMP) existing in the non-active area (N/A) overlaps a portion of a first outermost touch electrode (O-TE1) and a portion of a second outermost touch electrode (O-TE2).

The size (area) of the overlapping area between the first outermost touch electrode (O-TE1) and the capacitance compensation pattern (COMP) may be different from the size (area) of the overlapping area between the second outermost touch electrode (O-TE2) and the capacitance compensation pattern (COMP).

According to the aspect of the present disclosure of FIG. 7, the length of the first touch line (TL1) electrically connected to the first outermost touch electrode (O-TE1) is greater than that of the second touch line (TL2) electrically connected to the second outermost touch electrode (O-TE2).

Therefore, when the first touch line (TL1) is longer than the second touch line (TL2), the parasitic capacitance (Cp) generated between a touch sensor metal {including the first outermost touch electrode (O-TE1)} associated with the first touch line (TL1) and the cathode (CATH) is greater than the parasitic capacitance (Cp) generated between a touch sensor metal {including the second outermost touch electrode (O-TE2)} associated with the second touch line (TL2) and the cathode (CATH).

Therefore, the size of the overlapping area between the first outermost touch electrode (O-TE1) and the capacitance compensation pattern (COMP) may be designed to be smaller than the size of the overlapping area between the second outermost touch electrode (O-TE2) and the capacitance compensation pattern (COMP).

The compensation capacitance, which is artificially generated between the first outermost touch electrode (O-TE1) and the capacitance compensation pattern (COMP), may be smaller than the compensation capacitance, which is artificially generated between the second outermost touch electrode (O-TE2) and the capacitance compensation pattern (COMP).

The difference between the compensating capacitance, which is artificially generated between the first outermost touch electrode (O-TE1) and the capacitance compensation pattern (COMP), and the compensation capacitance, which is artificially generated between the second outermost touch electrode (O-TE2) and the capacitance compensation pattern (COMP), may correspond to the difference between the parasitic capacitance (Cp), which is generated between a touch sensor metal {including the first outermost touch electrode (O-TE1)} associated with the first touch line (TL1) and the cathode (CATH), and the parasitic capacitance (Cp), which is generated between a touch sensor metal {including the second outermost touch electrode (O-TE2)} associated with the second touch line (TL2) and the cathode (CATH).

Thus, the deviation between the parasitic capacitance (Cp), which is generated between a touch sensor metal {including the first outermost touch electrode (O-TE1)} associated with the first touch line (TL1) and the cathode (CATH), and the parasitic capacitance (Cp), which is generated between a touch sensor metal {including the second outermost touch electrode (0-TE2)} associated with the second touch line (TL2) and the cathode (CATH), may be eliminated.

Now, two methods (structures) for controlling the size of the overlapping area between the extended portion (EP) of the outermost touch electrode (O-TE) and the capacitance compensation pattern (COMP) will be described below.

A first method enables control of the size of the overlapping area between the extended portion (EP) of the outermost touch electrode (O-TE) and the capacitance compensation pattern (COMP) by controlling the size of the extended portion of the outermost touch electrode (O-TE).

A second method enables control of the size of the overlapping area between the extended portion (EP) of the outermost touch electrode (O-TE) and the capacitance compensation pattern (COMP) by controlling the size of the capacitance compensation pattern (COMP).

The first method will be described below with reference to FIGS. 13 and 14, and subsequently, the second method will be described with reference to FIGS. 15 and 16.

Figure 13:
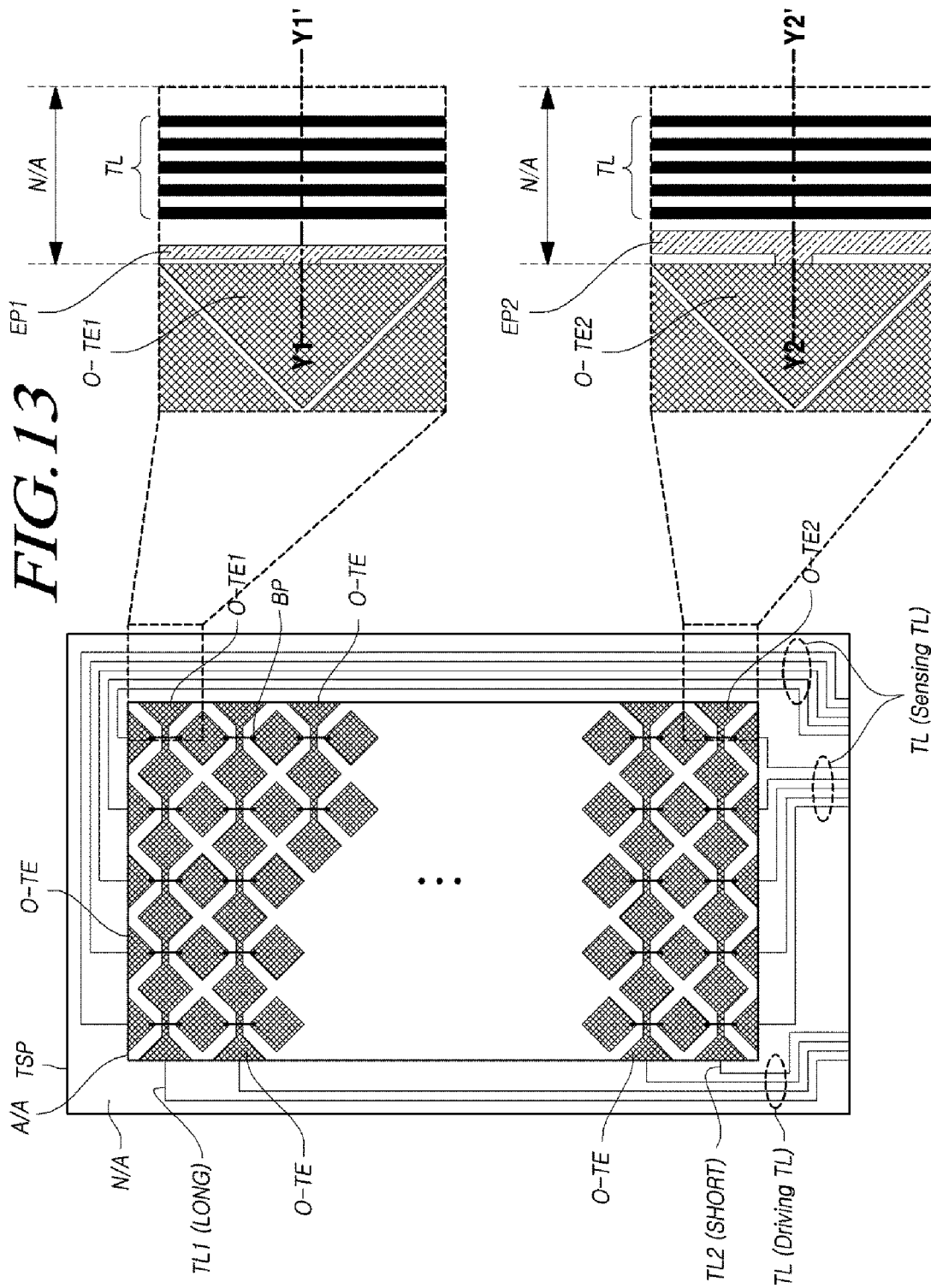
FIGS. 13 and 14 are a plan view and a cross-sectional view, respectively, illustrating a structure changing method in a non-active area by means of size control of an extended portion of an outermost touch electrode in order to reduce a parasitic capacitance deviation in a touch display device according to aspects of the present disclosure.
Figure 14:
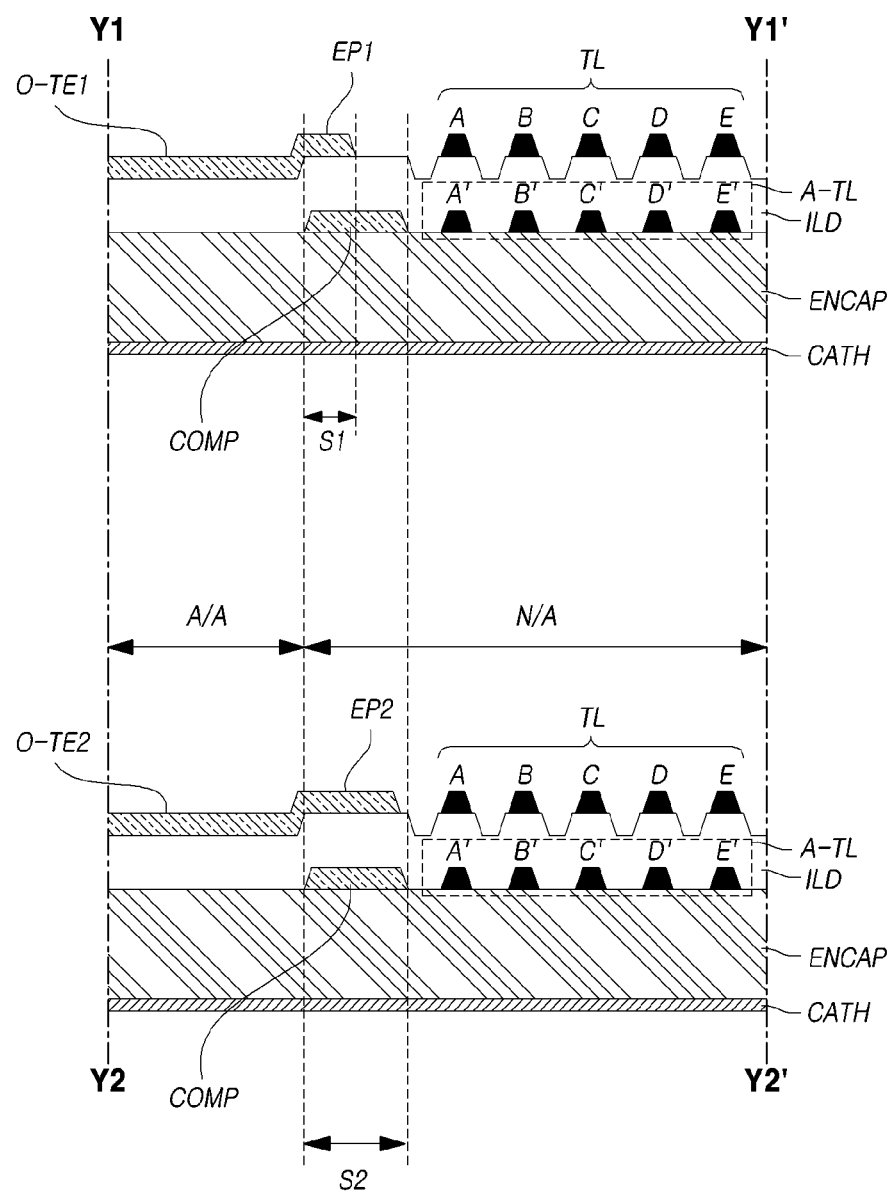

FIGS. 13 and 14 are a plan view and a cross-sectional view, respectively, illustrating a structure changing method in a non-active area (N/A) by means of size control of an extended portion (EP) of an outermost touch electrode (O-TE) in order to reduce a parasitic capacitance deviation in a touch display device 100 according to aspects of the present disclosure.

Referring to FIGS. 13 and 14, the area overlapping the capacitance compensation pattern (COMP) in the first outermost touch electrode (O-TE1) may be designed to be smaller than the area overlapping the capacitance compensation pattern (COMP) in the second outermost touch electrode (O-TE2).

The extended portion (EP1) extending from the first outermost touch electrode (O-TE1) to the non-active area (N/A) may be designed to be smaller than the extended portion (EP2) extending from the second outermost touch electrode (0-TE2) to the non-active area (N/A).

Therefore, the size (S1) of the overlapping area between the first outermost touch electrode (O-TE1) and the capacitance compensation pattern (COMP) may be smaller than the size (S2) of the overlapping area between the second outermost touch electrode (O-TE2) and the capacitance compensation pattern (COMP).

That is, the size (S1) of the overlapping area between the extended portion (EP1) of the first outermost touch electrode (O-TE1) and the capacitance compensation pattern (COMP) may be smaller than the size (S2) of the overlapping area between the extended portion (EP2) of the second outermost touch electrode (O-TE2) and the capacitance compensation pattern (COMP).

Accordingly, the compensation capacitance generated between the first outermost touch electrode (O-TE1) and the capacitance compensation pattern (COMP) may be less than the compensation capacitance generated between the second outermost touch electrode (O-TE2) and the capacitance compensation pattern (COMP).

It is possible to reduce or eliminate the parasitic capacitance deviation in which the parasitic capacitance (Cp) generated between a touch sensor metal {including the first outermost touch electrode (O-TE1)} associated with the first touch line (TL1) and a cathode (CATH) is greater than the parasitic capacitance (Cp) generated between a touch sensor metal {including the second outermost touch electrode (O-TE2)} associated with the second touch line (TL2) and a cathode (CATH).

As described above, it is possible to reduce or eliminate the parasitic capacitance deviation by controlling the size of an overlapping area between the extended portion (EP) of the outermost touch electrode (O-TE) and capacitance compensation pattern (COMP) by means of size control of the extended portion of the outermost touch electrode (O-TE).

In the case of the structure according to the first method, the capacitance compensation pattern (COMP) may have a constant width.

Figure 15:
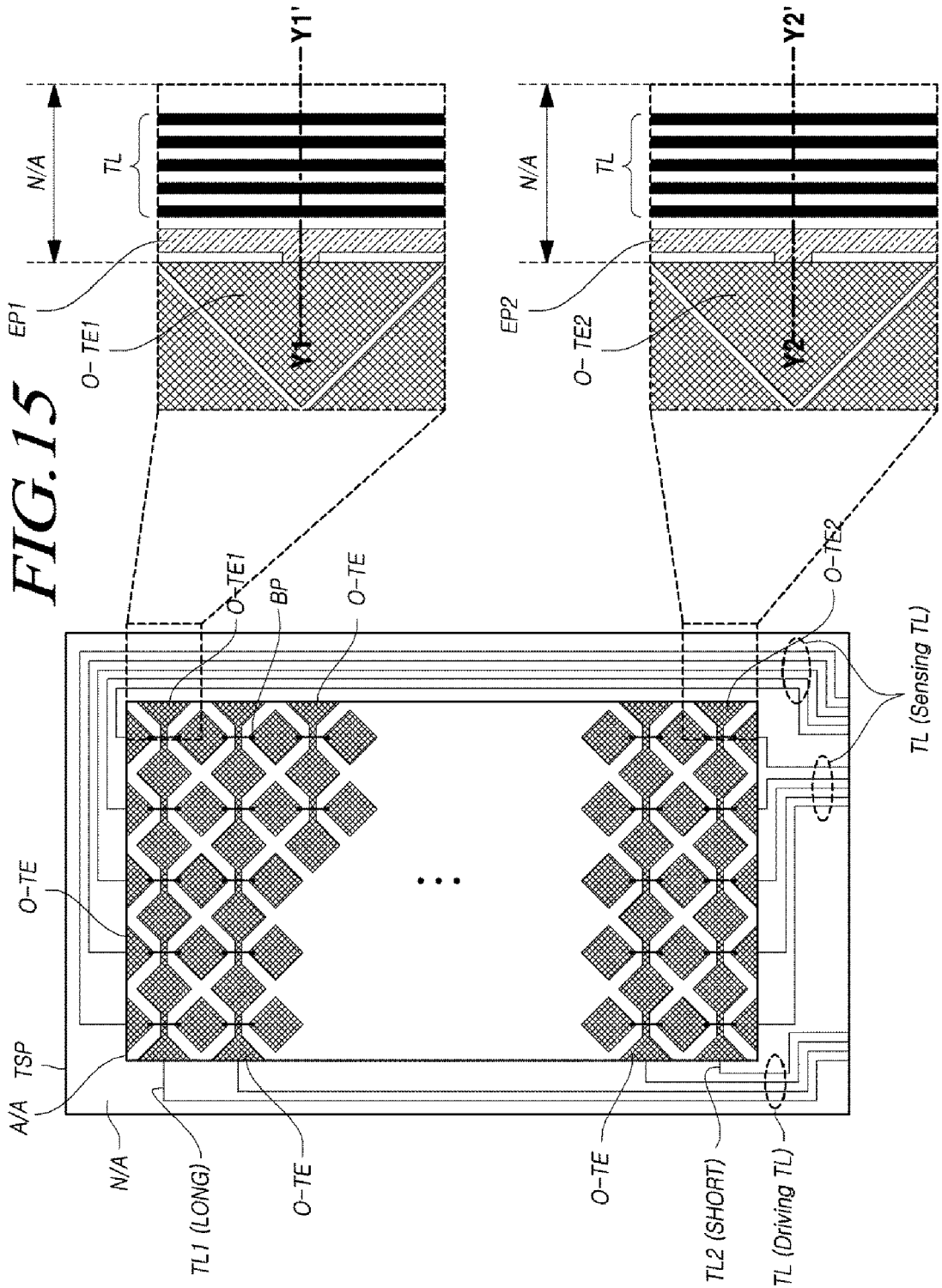
FIGS. 15 and 16 are a plan view and a cross-sectional view, respectively, illustrating a structure changing method in a non-active area by means of size control of a capacitance compensation pattern in order to reduce a parasitic capacitance deviation in a touch display device according to aspects of the present disclosure.
Figure 16:
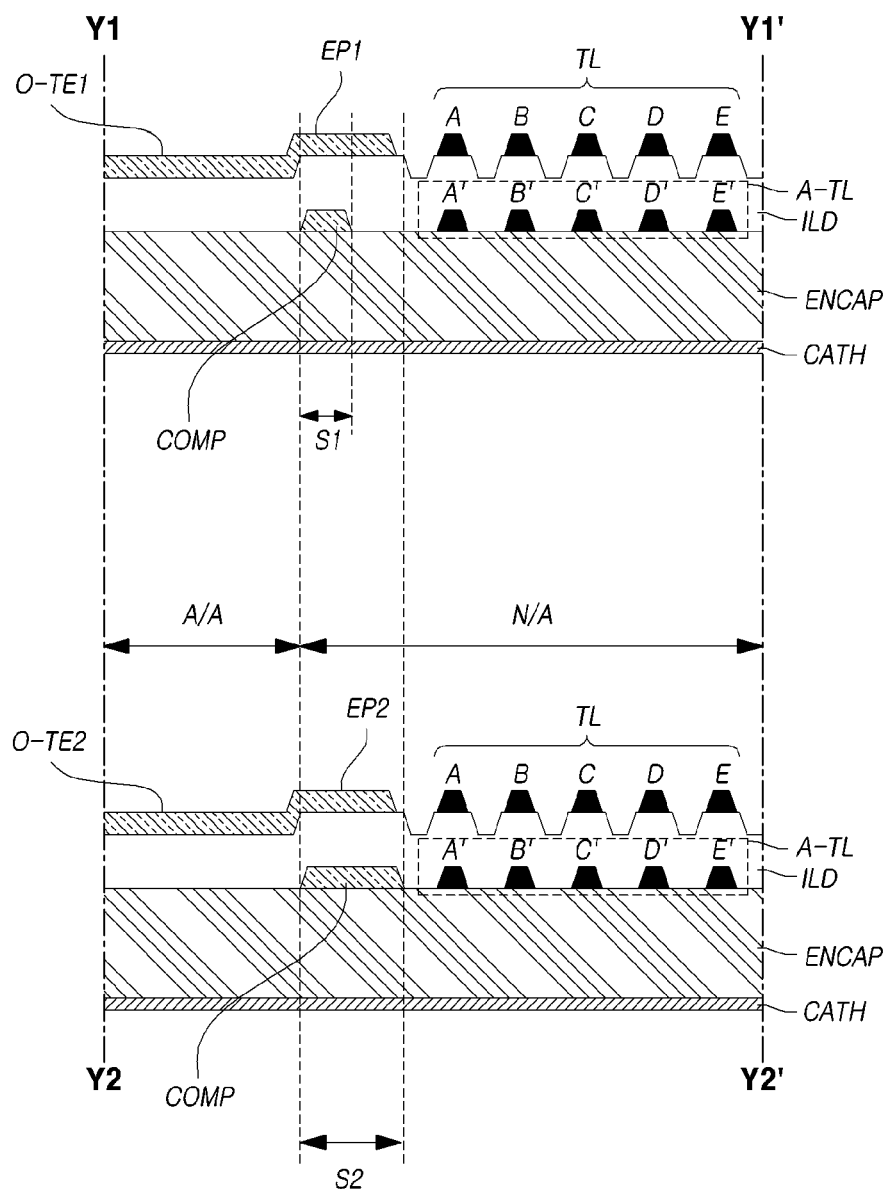

FIGS. 15 and 16 are a plan view and a cross-sectional view, respectively, illustrating a structure changing method in a non-active area (N/A) by means of size control of a capacitance compensation pattern (COMP) in order to reduce a parasitic capacitance deviation in a touch display device 100 according to aspects of the present disclosure.

An overlapping portion between the first outermost touch electrode (O-TE1) and the capacitance compensation pattern (COMP) may be designed so as to have a width smaller than that of an overlapping portion between the second outermost touch electrode (O-TE2) and the capacitance compensation pattern (COMP).

Therefore, the size (S1) of an overlapping area between the first outermost touch electrode (O-TE1) and the capacitance compensation pattern (COMP) may be smaller than the size (S2) of an overlapping area between the second outermost touch electrode (O-TE2) and the capacitance compensation pattern (COMP).

That is, the size (S1) of an overlapping area between the extended portion (EP1) of the first outermost touch electrode (O-TE1) and the capacitance compensation pattern (COMP) may be smaller than the size (S2) of an overlapping area between the extended portion (EP2) of the second outermost touch electrode (O-TE2) and the capacitance compensation pattern (COMP).

Accordingly, the compensation capacitance generated between the first outermost touch electrode (O-TE1) and the capacitance compensation pattern (COMP) may be less than the compensation capacitance generated between the second outermost touch electrode (0-TE2) and the capacitance compensation pattern (COMP).

As described above, it is possible to reduce or eliminate the parasitic capacitance deviation by controlling the size of an overlapping area between the extended portion (EP) of the outermost touch electrode (O-TE) and capacitance compensation pattern (COMP) by means of size control of the capacitance compensation pattern (COMP).

In the case of the structure according to the second method, the size of the portion (EP1) overlapping the capacitance compensation pattern (COMP) in the first outermost touch electrode (O-TE1) may be equal to the size of the portion (EP2) overlapping the capacitance compensation pattern (COMP) in the second outermost touch electrode (O-TE2).

That is, the extended portion (EP1) of the first outermost touch electrode (O-TE1) and the extended portion (EP2) of the second outermost touch electrode (O-TE2) may have the same size (area).

Referring to FIG. 16, in the capacitance compensation pattern (COMP), a portion overlapping the first outermost touch electrode (O-TE1) and a portion overlapping the second outermost touch electrode (O-TE2) may be integrated with or separated from each other.

In other words, the capacitance compensation pattern (COMP) overlapping the first outermost touch electrode (O-TE1) and the capacitance compensation pattern (COMP) overlapping the second outermost touch electrode (O-TE2) may be the same electrode, or may be different electrodes.

It is possible to adaptively design a parasitic capacitance deviation reduction structure according to the arrangement or dense state of electrodes or lines in the non-active area (N/A).

Figure 17:
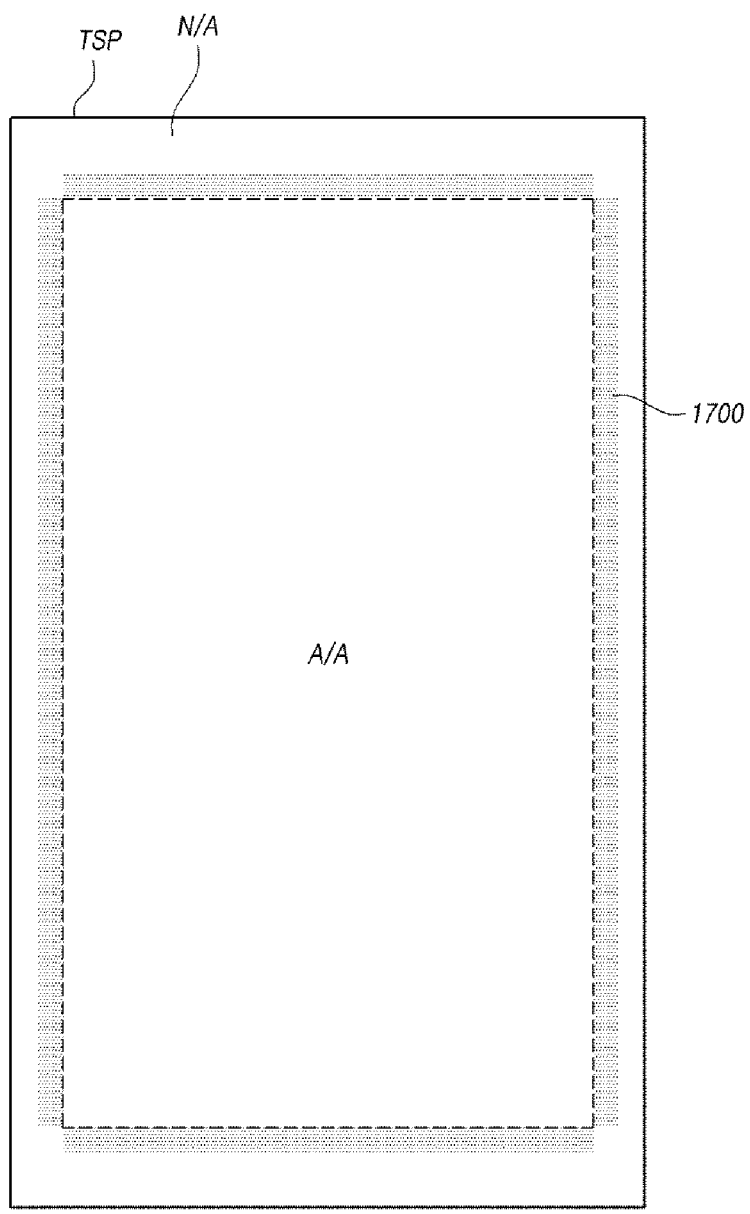
FIG. 17 is a view illustrating areas in which a structural change can be made in a non-active area in a touch display device in order to reduce a parasitic capacitance deviation according to aspects of the present disclosure.

FIG. 17 is a view illustrating an area 1700 in which a structural change can be made in a non-active area (N/A) in order to reduce a parasitic capacitance deviation in a touch display device 100 according to aspects of the present disclosure.

Referring to FIG. 17, the area 1700, in which a structural change can be made in the non-active area (N/A) in order to reduce a parasitic capacitance deviation in the touch display device 100 according to aspects of the present disclosure, may be an area overlapping between extended portion (EP) of the outermost touch electrode (O-TE) and the capacitance compensation pattern (COMP).

For example, a capacitance compensation pattern (COMP) may be provided in two, three, or four sides of the area 1700.

When the capacitance compensation pattern (COMP) is a ground voltage pattern, the capacitance compensation pattern (COMP) may be utilized as an electrostatic discharge path in the touch panel (TSP) or the display panel 110.

FIG. 18 is a view illustrating a mesh-type touch electrode (TE) in a touch display device 100 according to aspects of the present disclosure.

Referring to FIG. 18, in the touch display device 100 according to aspects of the present disclosure, the respective touch electrodes (TE) may be electrode metals (EM), which are patterned in the form of a mesh to have openings (OA). The openings (OA) may also be referred to as "open areas".

In the touch electrode (TE) made by patterning the electrode metal (EM) in the form of a mesh, the respective openings (OA) may correspond to light-emitting portions of one or more subpixels.

Figure 19:
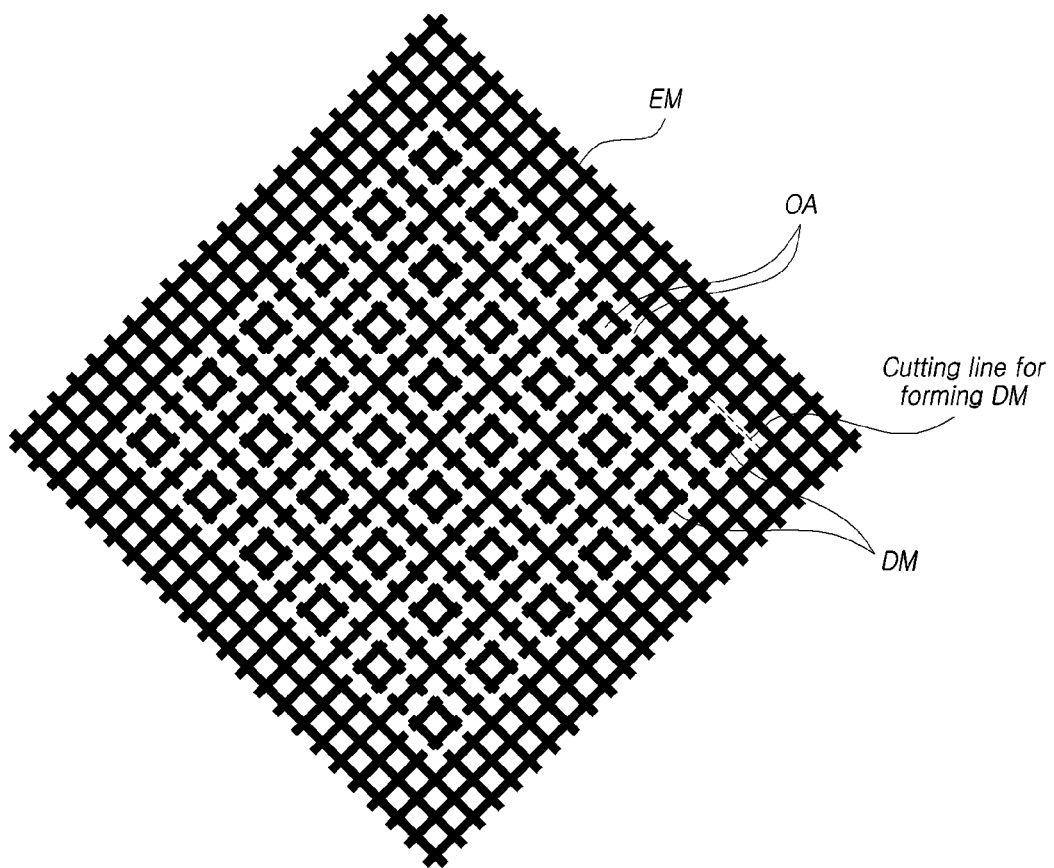
FIG. 19 is a view illustrating the case where dummy metals exist in an area of a mesh-type touch electrode in a touch display device according to aspects of the present disclosure.
Figure 20:
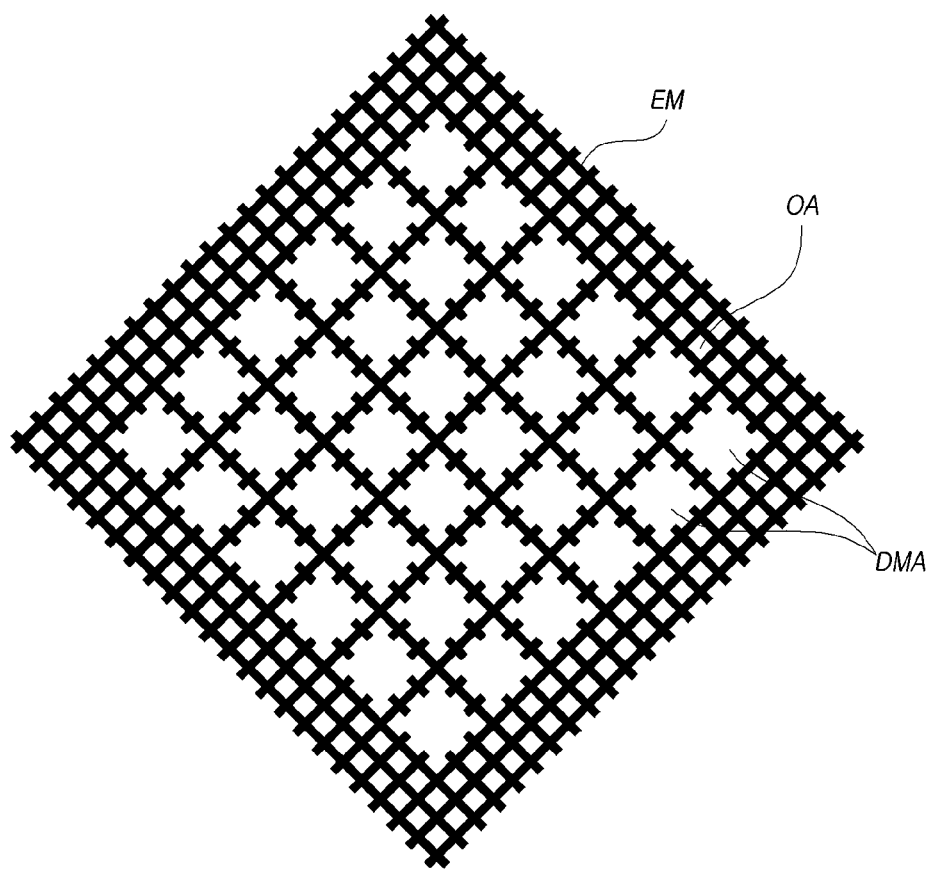
FIGS. 20 and 21 are views illustrating a touch electrode in which dummy metals are omitted in the case where dummy metals exist in an area of a mesh-type touch electrode in a touch display device according to aspects of the present disclosure.
Figure 21:
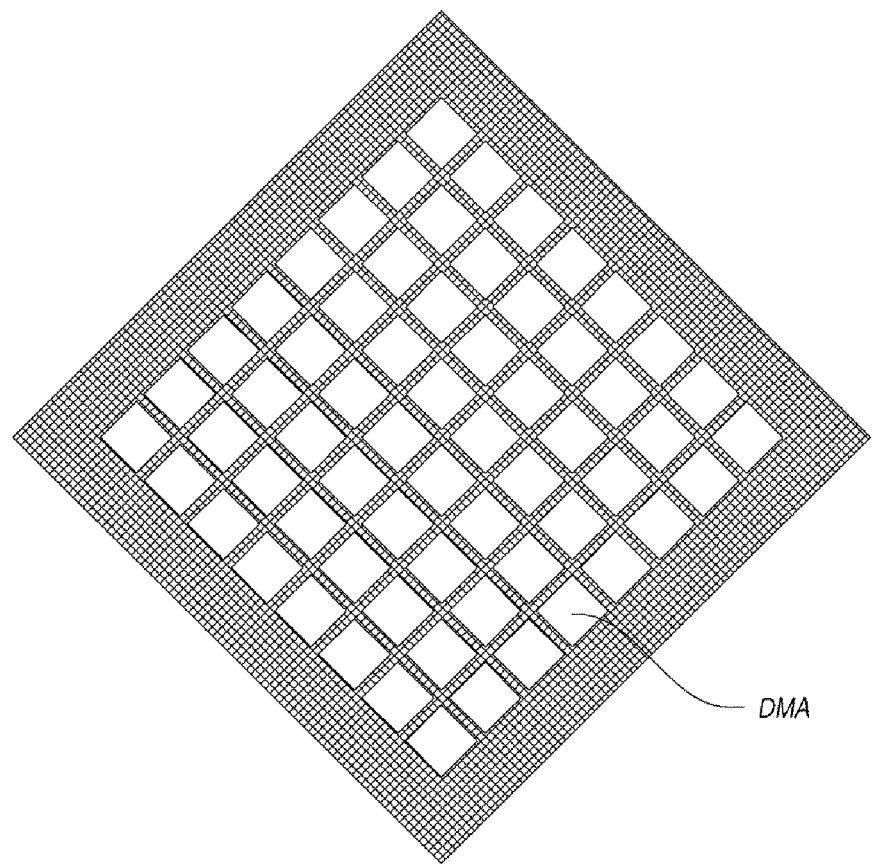

FIG. 19 is a view illustrating the case where dummy metal (DM) exists in an area of a mesh-type touch electrode (TE) in a touch display device 100 according to aspects of the present disclosure. FIGS. 20 and 21 are views illustrating a touch electrode (TE) in which dummy metals (DM) are omitted in the case where the dummy metals (DM) exist in an area of a mesh-type touch electrode (TE) in a touch display device 100 according to aspects of the present disclosure.

Referring to FIG. 19, all or some of a plurality of touch electrodes (TE) may have one or more dummy metals (DM) that are disconnected from the electrode metal (EM) in their areas.

An electrode metal (EM) is patterned in the form of a mesh, and then the electrode metal (EM) patterned in the form of a mesh is cut to form a touch electrode (touch electrode formation cutting).

Accordingly, the electrode metal (EM) is patterned in the form of a mesh to thus form each touch electrode (TE) as shown in FIG. 18. Here, as shown in FIG. 2, the touch electrodes (TE), which are integrated and electrically connected in a single touch electrode line, may have an electrode metal (EM) that has not been cut.

Thereafter, the electrode metal (EM) patterned in the form of a mesh in one touch electrode area may be cut into a predetermined pattern (dummy metal formation cutting), thereby forming dummy metals (DM) that are disconnected from the electrode metal (EM).

In the case of forming the dummy metal (DM) described above, the dummy metal (DM) corresponds to a part of the electrode metal (EM), which has been cut off therefrom.

Therefore, the electrode metal (EM) and the dummy metal (DM) may be made of the same material, and may be provided in the same layer.

The above-described method of forming a dummy metal (DM) makes it easier to form the dummy metal (DM) and enables to form the electrode metal (EM) and the dummy metal (DM) in a single layer.

FIG. 20 shows a touch electrode (TE) obtained by omitting a plurality of dummy metals (DM) in a single touch electrode area in FIG. 19.

Referring to FIG. 20, the area in which the dummy metals (DM) are omitted is referred to as a "dummy metal area (DMA)".

The dummy metals (DM) in one touch electrode area are merely examples in FIGS. 19 and 20, and the size and shape of the dummy metal (DM) in one touch electrode area may vary.

In addition, the positions of the dummy metals (DM) in one touch electrode area may vary.

Moreover, the ratio of an area occupied by the dummy metals (DM) to one touch electrode area (dummy metal ratio) may be variously configured.

FIG. 21 is a schematic illustration of the touch electrode (TE) of FIG. 20.

Meanwhile, if no dummy metal (DM) exists in the area of one touch electrode (TE) and if only the mesh-type electrode metal (EM) exists therein, there may be a visibility problem in which the contour of the electrode metal (EM) appears in the screen.

However, it is possible to prevent the visibility problem that may occur when one touch electrode (TE) is patterned in the form of a mesh by forming the dummy metals (DM) in the touch electrode area.

In addition, the magnitude of capacitance may be adjusted for each touch electrode (TE) by controlling the presence/absence or the number (dummy metal ratio) of the dummy metals (DM) for each touch electrode (TE), thereby improving the touch sensitivity.

The parasitic capacitance deviation reduction structure in the non-active area (N/A) has been described above, and a parasitic capacitance deviation reduction structure in an active area (A/A) will be described below.

Figure 22:
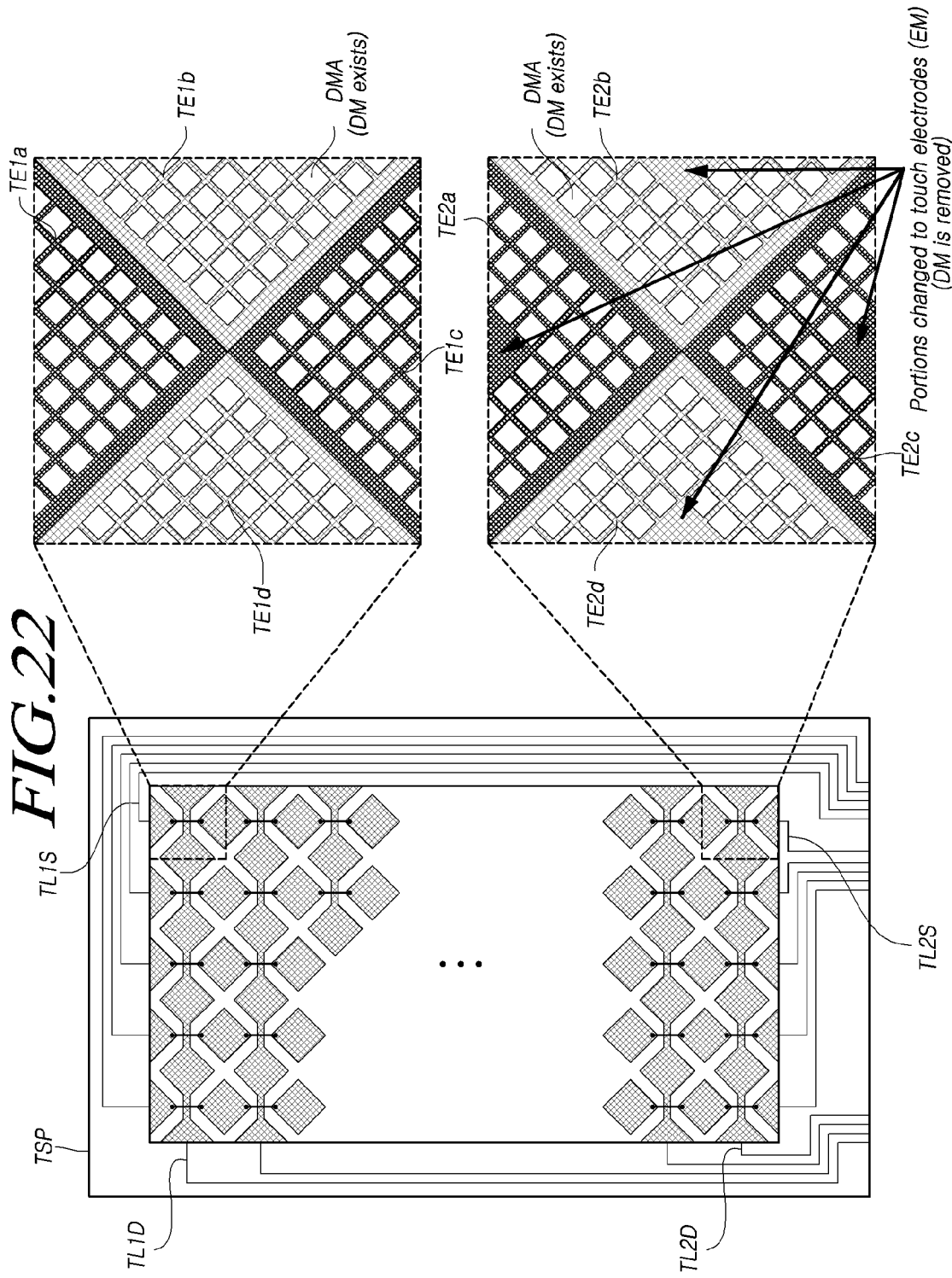
FIG. 22 is a view for explaining a parasitic capacitance deviation reduction structure in an active area in a touch display device according to aspects of the present disclosure.

FIG. 22 is a view for explaining a parasitic capacitance deviation reduction structure in an active area (A/A) in a touch display device 100 according to aspects of the present disclosure.

As described above, when the respective touch electrodes (TE) are electrode metals (EM), which are patterned in the form of a mesh so as to have openings (OA), there may be one or more dummy metals (DM), which are disconnected from the electrode metals (EM), in all or some of the area of the plurality of touch electrodes (TE).

A parasitic capacitance deviation reduction structure in the active area (A/A) uses a dummy metal (DM) that may exist in the touch electrode area of each touch electrode (TE).

More specifically, it is possible to reduce a deviation of the parasitic capacitance (Cp) caused by the length differences of the touch lines (TL) by adjusting a dummy metal ratio (DMR) of each touch electrode (TE), which is patterned in the form of a mesh, in the active area (A/A).

Here, the dummy metal ratio (DMR) refers to the ratio of an area occupied by all of the dummy metals (DM) to one touch electrode area.

For example, in the case where the plurality of touch lines (TL) includes first touch lines (TL1D and TL1S) and second touch lines (TL2D and TL2S), which have different lengths, the ratio {dummy metal ratio (DMR)} of the area occupied by the dummy metals (DM) to the area of first touch electrodes (TE1a, TE1b, TE1c, and TE1d) electrically connected to the first touch lines (TL1D and TL1S) may be different from the ratio {dummy metal ratio (DMR)} of the area occupied by the dummy metals (DM) to the area of second touch electrodes (TE2a, TE2b, TE2c, and TE2d) electrically connected to the second touch lines (TL2D and TL2S).

As another example, in the case where the plurality of touch lines (TL) includes first touch lines (TL1D and TL1S) and second touch lines (TL2D and TL2S), which have different lengths, the presence or absence of a dummy metal (DM) in the area of first touch electrodes (TE1a, TE1b, TE1c, and TE1d) electrically connected to the first touch lines (TL1D and TL1S) may be different from the presence or absence of a dummy metal (DM) in the area of second touch electrodes (TE2a, TE2b, TE2c, and TE2d) electrically connected to the second touch lines (TL2D and TL2S).

As described above, it is possible to adjust the parasitic capacitance deviations for the respective touch electrodes (TE) connected to the touch lines (TL) having different lengths by differently adjusting the presence or absence of the dummy metal (DM) or the dummy metal ratio (DMR) in the touch electrode area.

As shown in the example of FIG. 22, the case where the first touch lines (TL1D and TL1S) are longer than the second touch lines (TL2D and TL2S) will be described in more detail as follows.

For example, the ratio (DMR) of the area occupied by the dummy metals (DM) to the area of the first touch electrodes (TE1a, TE1b, TE1c, and TE1d) electrically connected to the first long touch lines (TL1D and TL1S) may be greater than the ratio (DMR) of the area occupied by the dummy metals (DM) to the area of the second touch electrodes (TE2a, TE2b, TE2c, and TE2d) electrically connected to the second short touch lines (TL2D and TL2S).

As another example, dummy metals (DM) may exist in the area of the first touch electrodes (TE1a, TE1b, TE1c, and TE1d) electrically connected to the first longer touch lines (TL1D and TL1S), and no dummy metal (DM) may exist in the area of the second touch electrodes (TE2a, TE2b, TE2c, and TE2d) electrically connected to the second shorter touch lines (TL2D and TL2S).

Referring to the example in FIG. 22, the first touch lines (TL1D and TL1S) are longer than the second touch lines (TL2D and TL2S).

Therefore, when the dummy metal ratios or the presence or absence of the dummy metal are not adjusted {that is, when the dummy metal ratios or the presence or absence of the dummy metal are the same in the touch electrode (TE)}, the parasitic capacitance (Cp) generated between the first touch electrodes (TE1a, TE1b, TE1c, and TE1d) and the cathode (CATH) may be greater than the parasitic capacitance (Cp) generated between the second touch electrodes (TE2a, TE2b, TE2c, and TE2d) and the cathode (CATH).

According to the application of the above-mentioned parasitic capacitance deviation reduction structure, the ratio (DMR) of the area occupied by the dummy metals (DM) to the area of the first touch electrodes (TE1a, TE1b, TE1c, and TE1d) becomes greater than the ratio (DMR) of the area occupied by the dummy metals (DM) to the area of the second touch electrodes (TE2a, TE2b, TE2c, and TE2d).

When the parasitic capacitance deviation reduction structure is applied, since the dummy metal ratio (DMR) of the first touch electrodes (TE1a, TE1b, TE1c, and TE1d) is greater than that of the second touch electrodes (TE2a, TE2b, TE2c, and TE2d), the ratio (effective electrode ratio) of an electrode metal portion serving as a substantial electrode to the first touch electrodes (TE1a, TE1b, TE1c, and TE1d) is lower than the ratio (effective electrode ratio) of an electrode metal portion serving as a substantial electrode to the second touch electrodes (TE2a, TE2b, TE2c, and TE2d).

Therefore, when the parasitic capacitance deviation reduction structure is applied to the first touch electrodes (TE1a, TE1b, TE1c, and TE1d), since the amount of parasitic capacitance compensation is small or zero, the parasitic capacitance (Cp) generated between the first touch electrodes (TE1a, TE1b, TE1c, and TE1d) and the cathode (CATH) may not be changed or may be slightly increased, compared to the parasitic capacitance in the case where the parasitic capacitance deviation reduction structure is not applied.

However, when the parasitic capacitance deviation reduction structure is applied to the second touch electrodes (TE2a, TE2b, TE2c, and TE2d), since the amount of parasitic capacitance compensation is relatively increased, the parasitic capacitance (Cp) generated between the second touch electrodes (TE2a, TE2b, TE2c, and TE2d) and the cathode (CATH) may be relatively further increased, compared to the case parasitic capacitance in the case where the parasitic capacitance deviation reduction structure is not applied.

As a result, it is possible to reduce or eliminate the parasitic capacitance deviation that occurs when the parasitic capacitance deviation reduction structure is not applied.

Figure 23:
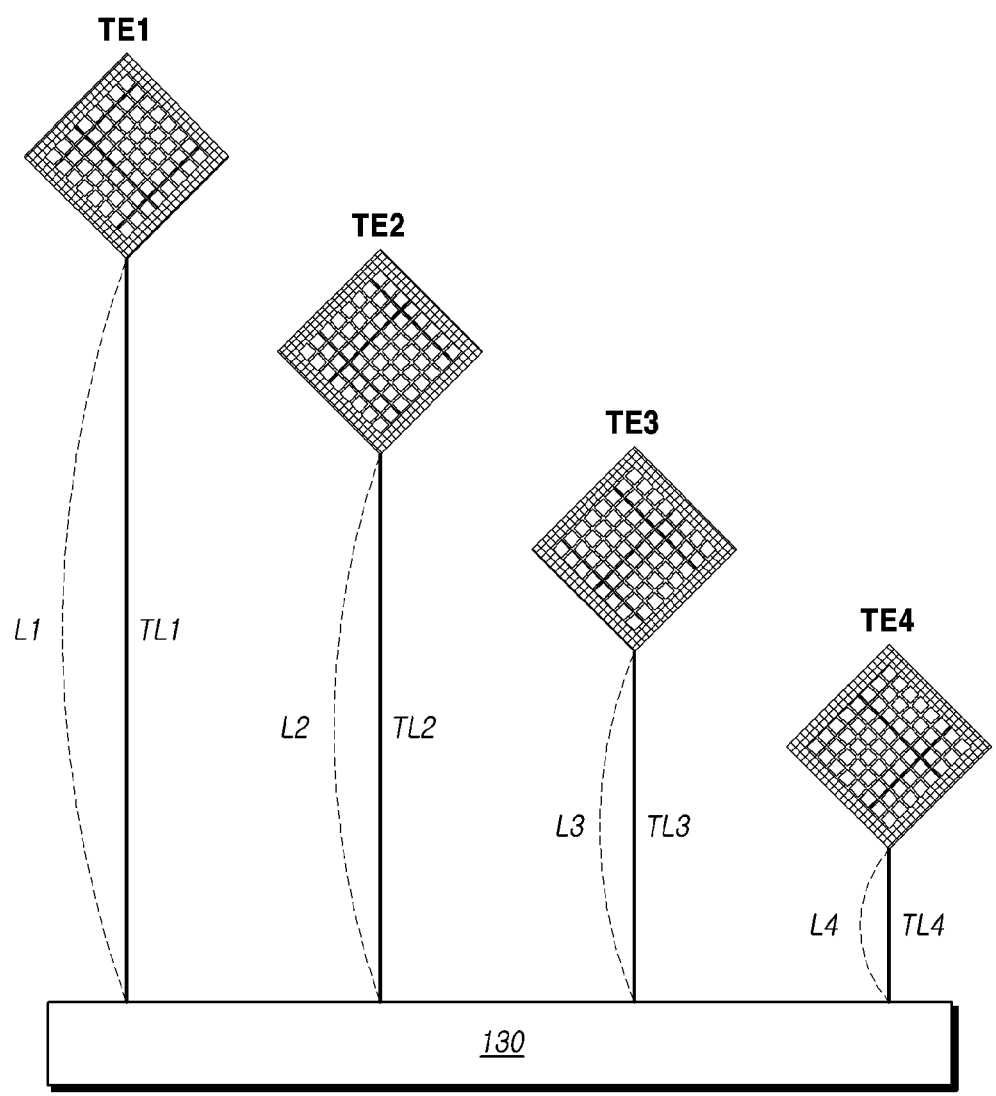
FIGS. 23 and 24 are exemplary views of a parasitic capacitance deviation reduction structure in an active area (A/A) in a touch display device 100 according to aspects of the present disclosure.
Figure 24:
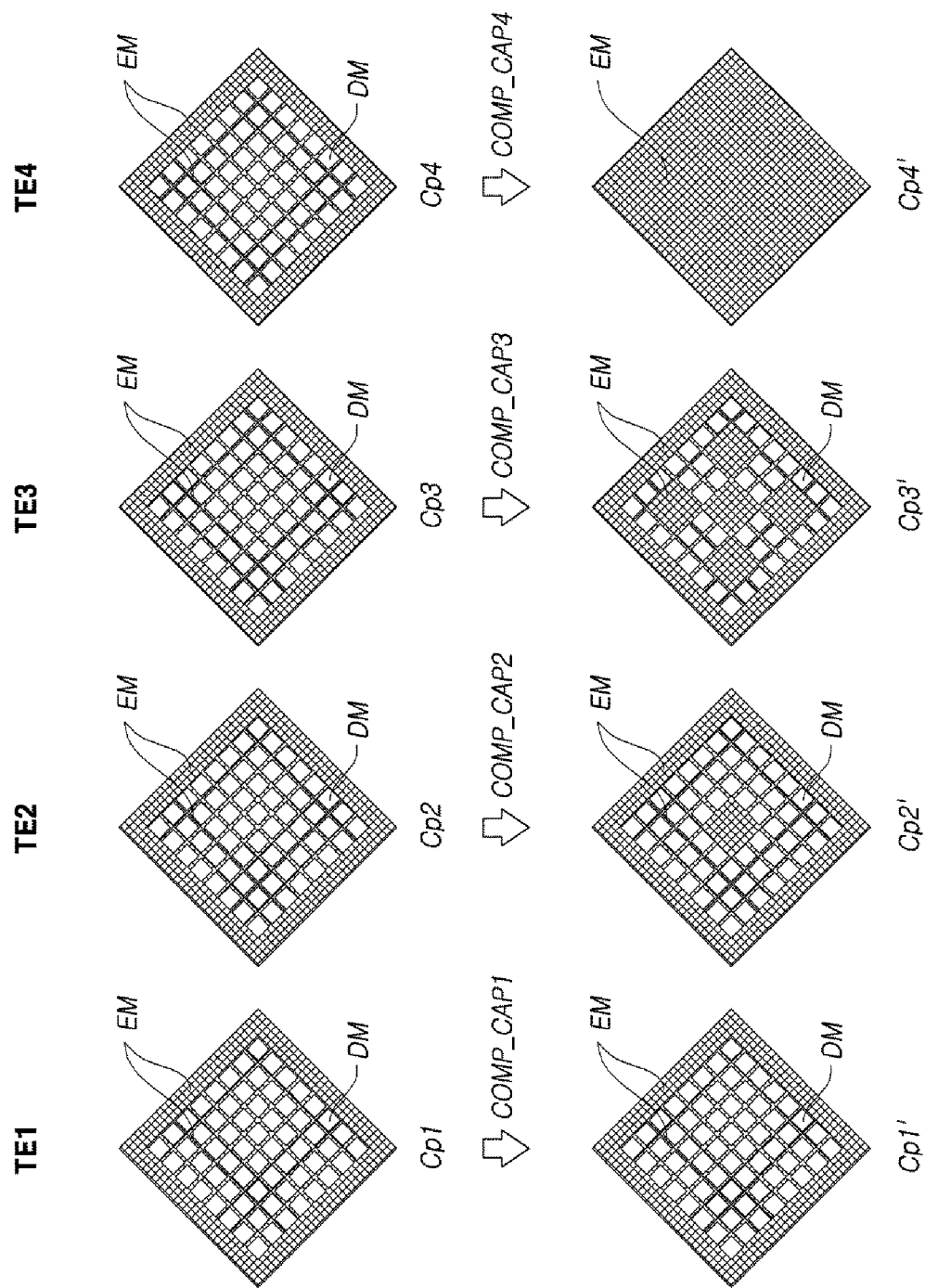

FIGS. 23 and 24 are exemplary views of a parasitic capacitance deviation reduction structure in an active area (A/A) in a touch display device 100 according to aspects of the present disclosure.

Referring to FIG. 23, four touch electrodes (TE1, TE2, TE3, and TE4) are electrically connected to the touch circuit 130 through four touch lines (TL1, TL2, TL3, and TL4), which have different lengths. The four touch electrodes (TE1, TE2, TE3, and TE4) may be either a driving touch electrode or a sensing touch electrode.

The touch line (TL1) has a length of L1, the touch line (TL2) has a length of L2, the touch line (TL3) has a length of L3, and the touch line (TL4) has a length of L4.

The length decreases in order of the touch line (TL1), the touch line (TL2), the touch line (TL3), and then the touch line (TL4) (i.e., L1>L2>L3>L4).

FIG. 23 shows the four touch electrodes (TE1, TE2, TE3, and TE4) in the case where the presence or absence of the dummy metal (DM) or a dummy metal ratio (DMR) is not adjusted (that is, when the parasitic capacitance deviation reduction structure is not applied).

Structures of the four touch electrodes (TE1, TE2, TE3, and TE4) before and after the application of the parasitic capacitance deviation reduction structure will be described with reference to FIG. 24.

In the case where the parasitic capacitance deviation reduction structure is not applied, the parasitic capacitance deviation may occur as follows.

Due to a relationship between the lengths (L1>L2>L3>L4) of the four touch lines (TL1, TL2, TL3, and TL4), the parasitic capacitance decreases in the order of the parasitic capacitance (Cp1) generated between the touch electrode (TE1) and the cathode (CATH), the parasitic capacitance (Cp2) generated between the touch electrode (TE2) and the cathode (CATH), the parasitic capacitance (Cp3) generated between the touch electrode (TE3) and the cathode (CATH), and then the parasitic capacitance (Cp4) generated between the touch electrode (TE4) and the cathode (CATH) (i.e., Cp1>Cp2>Cp3>Cp4).

When the parasitic capacitance deviation reduction structure is applied, the dummy metal ratio decreases in the order of the dummy metal ratio in the area of the touch electrode (TE1), the dummy metal ratio in the area of the touch electrode (TE2), the dummy metal ratio in the area of the touch electrode (TE3), and then the dummy metal ratio in the area of the touch electrode (TE4). The dummy metal (DM) may not exist in the area of the touch electrode (TE 4).

That is, when the parasitic capacitance deviation reduction structure is applied, the effective electrode ratio increases in the order of the effective electrode ratio in the area of the touch electrode (TE1), the effective electrode ratio in the area of the touch electrode (TE2), the effective electrode ratio in the area of the touch electrode (TE3), and then the effective electrode ratio in the area of the touch electrode (TE4).

Therefore, when the parasitic capacitance deviation reduction structure is applied, the amount of parasitic capacitance compensation increases in the order of the amount of parasitic capacitance compensation (COMP_CAP1) in the area of the touch electrode (TE1), the amount of parasitic capacitance compensation (COMP_CAP2) in the area of the touch electrode (TE2), the amount of parasitic capacitance compensation (COMP_CAP3) in the area of the touch electrode (TE3), and then the amount of parasitic capacitance compensation (COMP_CAP4) in the area of the touch electrode (TE4) (i.e., COMP_CAP1<COMP_CAP2< COMP_CAP3<COMP_CAP4).

When the parasitic capacitance deviation reduction structure is applied, even if there are length differences (L1>L2>L3>L4) between the four touch lines (TL1, TL2, TL3, and TL4), the parasitic capacitance (Cp1') generated between the touch electrode (TE1) and the cathode (CATH), the parasitic capacitance (Cp2') generated between the touch electrode (TE2) and the cathode (CATH), the parasitic capacitance (Cp3') generated between the touch electrode (TE3) and the cathode (CATH), and the parasitic capacitance (Cp4') generated between the touch electrode (TE4) and the cathode (CATH) become equal or similar to each other (i.e., Cp1'=Cp2'=Cp3'=Cp4').

As shown in FIG. 24, when the dummy metal ratio is reduced {that is, when the dummy metal (DM) is changed to the electrode metal (EM) corresponding to the touch electrode (TE)}, the dummy metal (DM) positioned in the center of the touch electrode area may be changed first.

Figure 25:
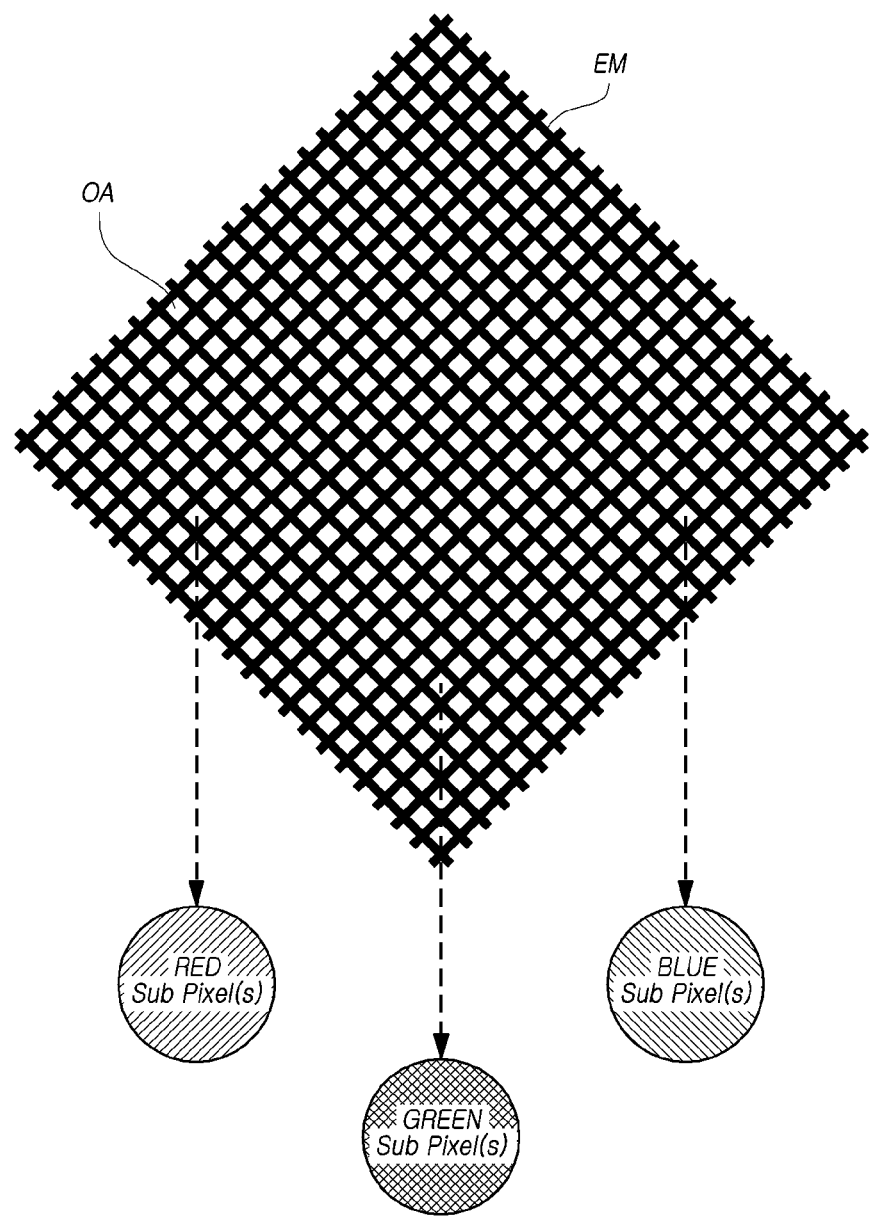
FIG. 25 is a diagram illustrating a correspondence relationship between an area of a mesh-type touch electrode and subpixel areas in a touch display device according to aspects.

FIG. 25 is a diagram illustrating a correspondence relationship between the area of a mesh-type touch electrode (TE) and a subpixel area in a touch display device 100 according to aspects of the present disclosure.

Referring to FIG. 25, in the touch display device 100 according to aspects of the present disclosure, the respective touch electrodes (TE) may be electrode metals (EM) that are patterned in the form of a mesh so as to have openings (OA). The openings (OA) may also be referred to as "open areas".

In the touch electrode (TE) formed by patterning the electrode metal (EM) in the form of a mesh, the respective openings (OA) may correspond to light-emitting portions of one or more subpixels.

For example, in the case where the display panel 110 is an LCD panel, the light-emitting portion of the subpixel may include a pixel electrode, a color filter, or the like. When the display panel 110 is an OLED panel, the light-emitting portion of the subpixel may include an anode electrode of the organic light-emitting diode (OLED), an organic light-emitting layer thereof, and the like, and, in some cases, may include a color filter or the like.

As described above, the electrode metal (EM) of the touch electrode (TE) may be patterned such that the positions of the respective open areas (OA) existing in the area of the touch electrode (TE) correspond to the light-emitting portions of one or more subpixels when viewed from above, thereby improving the emission efficiency of the display panel 110 even if the electrode metal (EM) is made of an opaque material.

Figure 26:
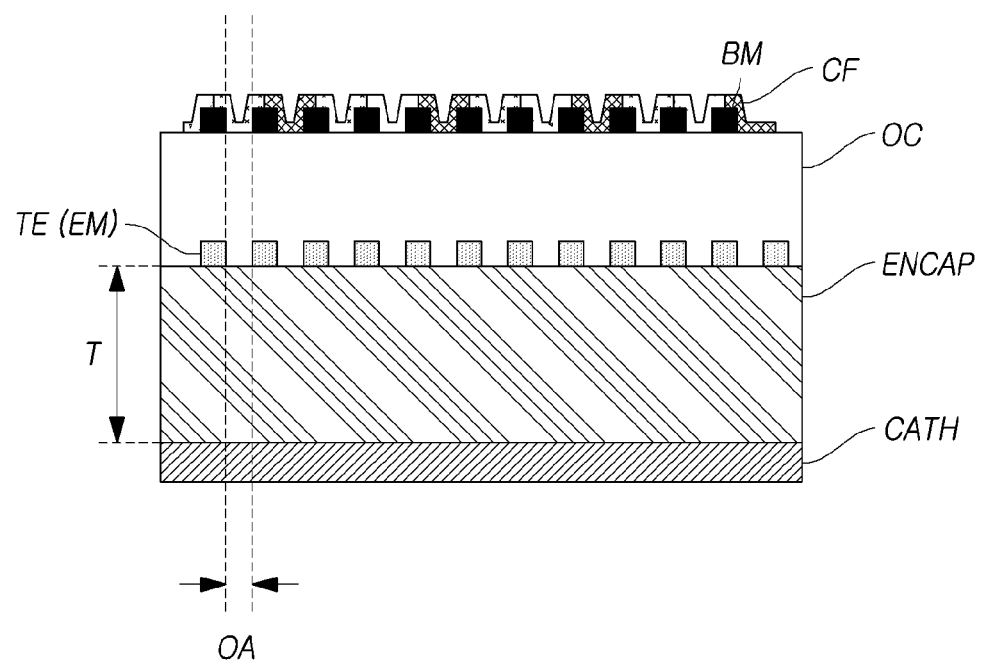
FIGS. 26 and 27 are exemplary views illustrating the positions of color filters and black matrices in a touch display device according to aspects of the present disclosure.
Figure 27:
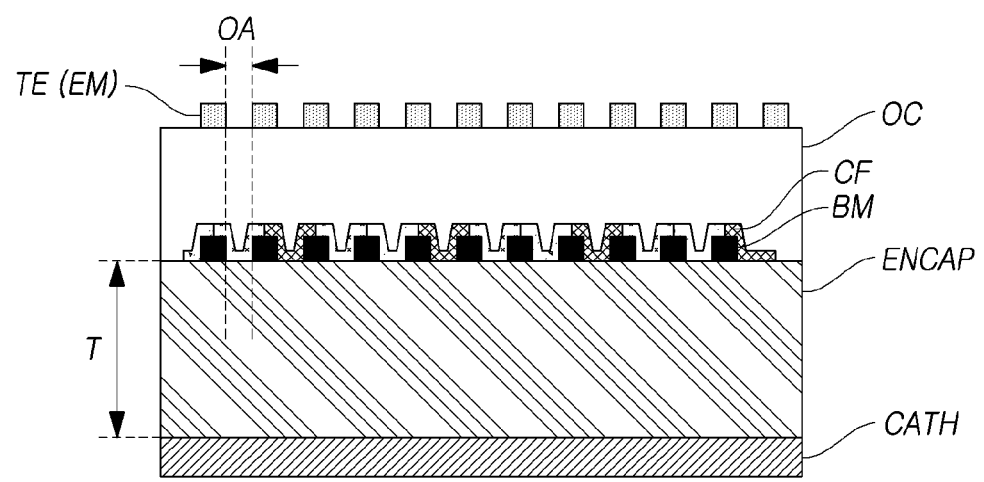

FIGS. 26 and 27 are exemplary views illustrating the positions of color filters and black matrices in a touch display device 100 according to aspects of the present disclosure.

Referring to FIGS. 26 and 27, a cathode (CATH) of an organic light-emitting diode (OLED) may be provided under an encapsulation layer (ENCAP).

The encapsulation layer (ENCAP) may have, for example, a thickness of 5 micrometers or more.

As described above, the parasitic capacitance generated between the cathode (CATH) and the touch electrodes (TE) of the organic light-emitting diode (OLED) can be reduced by designing the encapsulation layer (ENCAP) so as to have a thickness of 5 micrometers or more. Thus, it is possible to prevent deterioration of touch sensitivity due to the parasitic capacitance.

The respective touch electrodes (TE) may be patterned in the form of a mesh in which the electrode metal (EM) has a plurality of open areas (OA), and there may be one or more subpixels or light-emitting portions thereof in the plurality of open areas (OA) when viewed in the vertical direction.

As described above, the electrode metal (EM) of the touch electrode (TE) may be patterned such that the light-emitting portions of one or more subpixels are provided to correspond to the respective positions of the open areas (OA) existing in the area of the touch electrode (TE) when viewed from above, thereby improving an aperture ratio and emission efficiency of the display panel 110.

Therefore, as shown in FIGS. 26 and 27, the position of a black matrix (BM) corresponds to the position of the electrode metal (EM) of the touch electrode (TE).

In addition, the positions of a plurality of color filters (CF) correspond to the positions of the plurality of touch electrodes (TE).

As described above, since the plurality of color filters (CF) are located at the positions corresponding to the positions of the plurality of open areas (OA), it is possible to provide an organic light-emitting display panel (in particular, when a white OLED is used) and a touch display device 100 having excellent light-emission efficiency.

A vertical positional relationship between the color filters (CF) and the touch electrodes (TE) will now be described.

As shown in FIG. 26, a plurality of color filters (CF) and black matrices (BM) may be positioned on the plurality of touch electrodes (TE).

That is, the color filters (CF) may be positioned on the encapsulation layer (ENCAP), and may be positioned on touch sensor metals such as the touch electrodes (TE) or the touch lines (TL).

The plurality of color filters (CF) and black matrices (BM) may be positioned on an overcoat layer (OC) on the plurality of touch electrodes (TE).

As shown in FIG. 27, the plurality of color filters (CF) and black matrices (BM) may be positioned under the plurality of touch electrodes (TE).

The plurality of touch electrodes (TE) may be positioned on the overcoat layer (OC) on the plurality of color filters (CF) and black matrices (BM).

That is, the color filters (CF) may be positioned on the encapsulation layer (ENCAP) and between the touch sensor metal, such as the touch electrode (TE) or the touch line (TL), and the encapsulation layer (ENCAP).

According to the above description, it is possible to provide an OLED display-type touch display device 100 having an optimal positional relationship between the color filters (CF) and the touch electrodes (TE) in consideration of the display performance, such as the light-emitting performance or the like, and the touch performance.

There have been attempts to embed a touch panel (TSP) including touch electrodes (TE) in the display panel 110 in order to improve manufacturing convenience of the touch display device 100 and in order to reduce the size thereof.

However, there are considerable difficulties and a lot of limitations in embedding the touch panel (TSP) in the display panel 110, which is an organic light-emitting display panel.

For example, in the process of manufacturing the display panel 110, which is an organic light-emitting display panel, it is not easy to execute a high-temperature process for forming the touch electrodes (TE) inside the panel using a metal material because of organic materials.

The limitation factors, such as the structural characteristics of the organic light-emitting display panel or the processes thereof, make it difficult to dispose the touch electrodes (TE), as a touch sensor, inside the display panel 110, which is an organic light-emitting display panel. Accordingly, in the prior art, a touch structure has been implemented such that the touch panel (TSP) is attached onto the display panel 110, which is an organic light-emitting display panel, instead of embedding the touch panel (TSP) therein.

However, as shown in FIGS. 26 and 27, it is possible to provide a display panel 110, which is an organic light-emitting display panel, having a touch panel (TSP), which has excellent display performance and touch performance, embedded therein by means of a touch-on-encapsulation layer (TOE) structure in which the touch electrodes (TE) are formed on the encapsulation layer (ENCAP) and by means of a color-on-encapsulation Layer (COE) structure in which the color filters (CF) are formed on the encapsulation layer (ENCAP).

One of two parasitic capacitance variation reduction structures described above {1. adjusting the size of the overlapping area between the touch electrode (TE) and the capacity compensation pattern (COMP), 2. adjusting the dummy metal ratio in the touch electrode area} may be applied, or both of the two parasitic capacitance deviation reduction structures may be applied.

According to the aspects described above, it is possible to provide a touch display device and a touch panel having a structure capable of reducing a deviation of the parasitic capacitance, which is generated in touch sensor metals, such as touch electrodes or touch lines, regardless of the arrangement of the touch sensor metals, such as touch electrodes or touch lines, in the touch panel.

In addition, according to the aspects of the present disclosure, it is possible to provide a touch display device and a touch panel having a structure capable of reducing a deviation of the parasitic capacitance, which is generated in touch sensor metals, such as touch electrodes or touch lines, even when there are differences in length between the touch lines.

In addition, according to the aspects of the present disclosure, it is possible to provide a touch display device and a touch panel having a structure capable of reducing a parasitic capacitance deviation in a non-active area corresponding to an image non-display area.

Further, according to the aspects of the present disclosure, it is possible to provide a touch display device and a touch panel having a structure capable of reducing a parasitic capacitance deviation in an active area corresponding to an image display area.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A touch display device comprising:
a display panel including a cathode and an encapsulation layer disposed on the cathode, and a touch panel having a plurality of touch electrodes and a plurality of touch lines disposed on the encapsulation layer and electrically connected to at least some of the plurality of touch electrodes, wherein each of the plurality of touch electrodes is an electrode metal patterned to have a mesh form and has openings;
a touch circuit driving the touch panel to sense execution or non-execution of a touch or a touch position; and
at least one dummy metal, which is disconnected from the electrode metal, is disposed in an area of at least some of the plurality of touch electrodes,
wherein a first touch line of the touch lines is longer than a second touch line of the touch lines,
wherein, when the at least one dummy metal does not exist in an area of a second touch electrode electrically connected to the second touch line, the at least one dummy metal exists in an area of a first touch electrode electrically connected to the first touch line,
wherein, when the at least one dummy metal exists in the area of the second touch electrode electrically connected to the second touch line, a ratio of an area occupied by the at least one dummy metal to the area of the first touch electrode electrically connected to the first touch line is greater than a ratio of an area occupied by the at least one dummy metal to the area of the second touch electrode electrically connected to the second touch line.

2. The touch display device of claim 1, wherein the touch panel is provided inside or outside a display panel comprising an active area in which an image is displayed and a non-active area outside the active area,
wherein the plurality of touch electrodes is disposed to correspond to the active area and the plurality of touch lines is disposed to correspond to the non-active area.

3. The touch display device of claim 1, further comprising color filters positioned on the encapsulation layer and on the touch sensor metals.

4. The touch display device of claim 1, wherein the color filters are positioned on the encapsulation layer and between the encapsulation layer and the touch sensor metals.

5. The touch display device of claim 1, wherein the openings in areas of the plurality of touch electrodes correspond to light-emitting portions of one or more subpixels.

6. A touch panel comprising:
a display panel including a cathode and an encapsulation layer disposed on the cathode, a plurality of touch electrodes wherein each of the plurality of touch electrodes is an electrode metal patterned to have a mesh form and has openings and a plurality of touch lines disposed on the encapsulation layer and electrically connected to at least some of the plurality of touch electrodes; and
at least one dummy metal, which is disconnected from the electrode metal, is disposed in an area of at least some of the plurality of touch electrodes,
wherein a first touch line of the touch lines is longer than a second touch line of the touch lines,
wherein, when the at least one dummy metal does not exist in an area of a second touch electrode electrically connected to the second touch line, the at least one dummy metal exists in an area of a first touch electrode electrically connected to the first touch line, and
wherein, when the at least one dummy metal exists in the area of the second touch electrode electrically connected to the second touch line, a ratio of an area occupied by the at least one dummy metal to the area of the first touch electrode electrically connected to the first touch line is greater than a ratio of an area occupied by the at least one dummy metal to the area of the second touch electrode electrically connected to the second touch line.

7. The touch panel of claim 6, wherein the electrode metal and the dummy metal are positioned in the same layer.

8. A touch display device, comprising:
a plurality of touch electrodes including first and second touch electrodes, the plurality of touch electrodes including a patterned electrode metal having a mesh form to have a plurality of openings;
a plurality of touch lines electrically connected to at least some of the plurality of touch electrodes, the plurality of touch lines including first and second touch lines and the first touch line is longer than the second touch line; and
at least one dummy metal disconnected from the patterned electrode metal and disposed in an area of at least some of the plurality of touch electrodes, the first touch electrode electrically connected to the first touch line and the second touch electrode electrically connected to the second touch line,
wherein the at least one dummy metal exists in an area of the first touch electrode electrically connected to the first touch line and no dummy metal exists in an area of the second touch electrode electrically connected to the second touch line.

9. The touch display device of claim 8, wherein a ratio of the area occupied by the at least one dummy metal to the area of the first touch electrode electrically connected to the first touch line is greater than a ratio of the area occupied by the at least one dummy metal to the area of the second touch electrode electrically connected to the second touch line.

10. The touch display device of claim 8, further comprising a touch panel embedded in a display panel,
wherein the display panel having the touch panel embedded therein includes a cathode, an encapsulation layer disposed on the cathode, and touch sensor metals including the plurality of touch electrodes and the plurality of touch lines positioned on the encapsulation layer.

11. The touch display device of claim 10, further comprising color filters positioned on the encapsulation layer and on the touch sensor metals.

12. The touch display device of claim 10, wherein the color filters are positioned on the encapsulation layer and between the encapsulation layer and the touch sensor metals.

13. The touch display device of claim 10, wherein the touch panel is provided inside or outside a display panel comprising an active area in which an image is displayed and a non-active area outside the active area,
wherein the plurality of touch electrodes is disposed to correspond to the active area and the plurality of touch lines is disposed to correspond to the non-active area.

14. The touch display device of claim 8, wherein the openings in areas of the plurality of touch electrodes correspond to light-emitting portions of one or more subpixels.

* * * * *